United States Patent
Nakagawa et al.

(10) Patent No.: US 8,072,541 B2
(45) Date of Patent: Dec. 6, 2011

(54) IMAGE PROCESSING APPARATUS AND METHOD FOR FORMAT CONVERSION

(75) Inventors: Akira Nakagawa, Kawasaki (JP); Shunsuke Kobayashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 12/382,124

(22) Filed: Mar. 9, 2009

(65) Prior Publication Data
US 2009/0231487 A1 Sep. 17, 2009

(30) Foreign Application Priority Data

Mar. 11, 2008 (JP) .................. 2008-061174
Jul. 15, 2008 (JP) .................. 2008-183456

(51) Int. Cl.
*H04N 11/20* (2006.01)
(52) U.S. Cl. .............. 348/453; 348/458
(58) Field of Classification Search ........ 348/441, 348/443, 444, 453, 458, 459; *H04N 7/01, H04N 11/20*
See application file for complete search history.

(56) References Cited

U.S. PATENT DOCUMENTS

| | | | |
|---|---|---|---|
| 5,182,645 A | 1/1993 | Breeuwer et al. | |
| 6,829,016 B2 * | 12/2004 | Hung | 348/581 |
| 2005/0030422 A1 | 2/2005 | Leone et al. | |
| 2011/0096226 A1 * | 4/2011 | Garrido et al. | 348/441 |

FOREIGN PATENT DOCUMENTS

| | | |
|---|---|---|
| EP | 0 465 732 A1 | 1/1992 |
| EP | 0 692 915 A2 | 1/1996 |
| EP | 2 099 223 A2 | 9/2009 |
| JP | 2000-092512 | 3/2000 |
| JP | 3292486 | 3/2002 |

OTHER PUBLICATIONS

"Problem and Solution of Current TV/HDTV Compatible encoding Scheme," The Institute of Electronics, Information and Communication Engineers, Proceedings of Spring Conference, D-335, 1992.
European Search Report dated Nov. 25, 2009 and issued in corresponding European Patent Application 09154603.6.

* cited by examiner

*Primary Examiner* — Sherrie Hsia
(74) *Attorney, Agent, or Firm* — Staas & Halsey LLP

(57) ABSTRACT

A signal processing apparatus converts interlaced 4:2:2-format video signals including a luminance component and two chroma components into interlaced 4:2:0 format video signals. A downsampling low-pass filter has such a group delay that a modulo-1 remainder of the group delay at frequency $\omega=0$ is substantially equal to 0.25. The downsampling low-pass filter is designed together with an associated upsampling low-pass filter such that the first downsampling low-pass filter and the upsampling low-pass filter substantially satisfy perfect reconstruction filter bank condition, and such that a sum of the group delay of the first downsampling low-pass filter and a group delay of a normalized filter obtained by making the sum of all the coefficients of the upsampling low-pass filter equal to 1 is substantially equal to an integer number at frequency $\omega=0$.

12 Claims, 22 Drawing Sheets

TOP FIELD　　　BOTTOM FIELD

TOP FIELD　　　BOTTOM FIELD

4:2:2-TO-4:2:0 CONVERSION     4:2:0-TO-4:2:2 CONVERSION
TOP FIELD

IMAGE PROCESSING APPARATUS AND METHOD FOR FORMAT CONVERSION

CROSS-REFERENCE TO RELATED APPLICATIONS

The present application is based upon and claims the benefit of priority from the prior Japanese Patent Applications No. 2008-061174 filed on Mar. 11, 2008 and 2008-183456 filed on Jul. 15, 2008, with the Japanese Patent Office, the entire contents of which are incorporated herein by reference.

FIELD

The disclosures herein relate to a video signal processing apparatus for converting a video signal in one format to a video signal in another format.

BACKGROUND

Video signals for moving pictures include a luminance signal and two chroma signals Cb and Cr. There are several formats for varying chroma signal resolutions. The 4:2:2 format is typically used for a digital interface in video equipment. An example of this video format includes the SMPTE 292M standard (i.e., HD-SDI) defined by the SMPTE (Society of Motion Picture and Television Engineers) For the purpose of video encoding in consumer products, on the other hand, the 4:2:0 format is typically used.

FIGS. 1A through 1D are drawings illustrating the sample point locations for luminance and chroma signals in the 4:2:2 format and the 4:2:0 format with respect to each of progressive scanning and interlaced scanning as defined in ITU-T H.264. In these figures, the symbol "○" represents the positions of luminance pixels, and the symbol "Δ" represents the positions of chroma pixels. It should be noted that although the illustration is given such that the horizontal positions of chroma pixels are slightly displaced from the positions of the luminance pixels for the sake of clarity, these pixels actually occupy the same horizontal pixel positions. As illustrated in FIG. 1A, the chroma samples are decimated by a ratio of 2:1 relative to the luminance samples in the horizontal direction for the progressive 4:2:2 format. In the vertical direction, however, the number of chroma samples is equal to the number of luminance samples. In the progressive 4:2:0 format illustrated in FIG. 1B, on the other hand, the number of chroma samples is decimated by a ratio of 2:1 relative to the number of luminance samples in both the horizontal direction and the vertical direction.

FIG. 1C illustrates the interlaced 4:2:2 format. The interlaced video frame is comprised of a top field and a bottom field. For both luminance and chroma components, the top field is formed by the even-numbered lines (i.e., 0, 2, 4, 6, . . . , lines starting from 0) taken out from the progressive 4:2:2 format frame illustrated in FIG. 1A. For both luminance and chroma components, the bottom field is formed by the odd-numbered lines (i.e., 1, 3, 5, 7, . . . , lines) taken out from the progressive 4:2:2 format frame illustrated in FIG. 1A.

FIG. 1D illustrates the interlaced 4:2:0 format. For both luminance and chroma components, the top field is formed by the even-numbered lines (i.e., 0, 2, 4, 6, . . . , lines starting from 0) taken out from the progressive 4:2:0 format frame illustrated in FIG. 1B. For both luminance and chroma components, the bottom field is formed by the odd-numbered lines (i.e., 1, 3, 5, 7, . . . , lines) taken out from the progressive 4:2:0 format frame illustrated in FIG. 1B. As can be seen by comparing FIG. 1C and FIG. 1D, the number of chroma pixels in the interlaced 4:2:0 format are decimated by half in the vertical direction relative to the chroma pixels in the interlaced 4:2:2 format. In various standards for moving picture encoding such as MPEG-2 and H.264/MPEG-4 AVC, the 4:2:0 format is widely used. MPEG-2 and H.264/MPEG-4 AVC support the 4:2:2 format in addition to the 4:2:0 format. While consumer products typically employ the 4:2:0 format, equipment that employs the 4:2:2 format may typically be limited for professional use.

[Patent Document 1] Japanese Patent Application Publication No. 2000-92512

[Patent Document 2] Japanese Patent No. 3292486

[Non-Patent Document 1] "Problem and Solution of Current TV/HDTV Compatible Encoding Scheme," The Institute of Electronics, Information and Communication Engineers, Proceedings of Spring Conference, D-334, 1992

SUMMARY

According to one embodiment, a signal processing apparatus for converting interlaced 4:2:2-format video signals including a luminance component and two chroma components into interlaced 4:2:0 format video signals includes a first downsampling unit configured to apply vertical-direction filtering to pixels in a first chroma field of the interlaced 4:2:2-format video signals by use of a first downsampling low-pass filter and to downsample by a ratio of 2:1 to produce a first chroma field of the interlaced 4:2:0-format video signals, and a second downsampling unit configured to apply vertical-direction filtering to pixels in a second chroma field of the interlaced 4:2:2-format video signals by use of a second downsampling low-pass filter obtained by reversing an order of coefficients of the first downsampling low-pass filter and to downsample by a ratio of 2:1 to produce a second chroma field of the interlaced 4:2:0-format video signals, wherein the first downsampling low-pass filter has such a group delay that a modulo-1 remainder of the group delay at frequency $\omega=0$ is substantially equal to 0.25, wherein the first downsampling low-pass filter is designed together with an associated upsampling low-pass filter such that the first downsampling low-pass filter and the upsampling low-pass filter satisfy perfect reconstruction filter bank condition within a predetermined error tolerance range, and such that a sum of the group delay of the first downsampling low-pass filter and a group delay of a normalized filter obtained by making a sum of all coefficients of the upsampling low-pass filter equal to 1 is substantially equal to an integer number at frequency $\omega=0$ within a predetermined error tolerance range.

According to one embodiment, a signal processing apparatus for converting interlaced 4:2:0-format video signals including a luminance component and two chroma components into interlaced 4:2:2 format video signals includes a first upsampling unit configured to apply vertical-direction filtering to pixels in a first chroma field of the interlaced 4:2:0-format video signals by use of a first upsampling low-pass filter and to upsample by a ratio of 1:2 to produce a first chroma field of the interlaced 4:2:2-format video signals, and a second upsampling unit configured to apply vertical-direction filtering to pixels in a second chroma field of the interlaced 4:2:0-format video signals by use of a second upsampling low-pass filter obtained by reversing an order of coefficients of the first upsampling low-pass filter and to upsample by a ratio of 1:2 to produce a second chroma field of the interlaced 4:2:2-format video signals, wherein the first upsampling low-pass filter is designed together with an associated downsampling low-pass filter such that the first upsampling low-pass filter and the downsampling low-pass filter satisfy perfect reconstruction filter bank condition within a predetermined error tolerance range, such that the downsampling low-pass filter has such a group delay that a modulo-1 remainder of the group delay at frequency ω=0 is substantially equal to 0.25, and such that a sum of the group delay of the downsampling low-pass filter and a group delay of a normalized filter obtained by making a sum of all coefficients of the first upsampling low-pass filter equal to 1 is substantially equal to an integer number at frequency ω=0 within a predetermined error tolerance range.

According to one embodiment, a signal processing method of converting interlaced 4:2:2-format video signals including a luminance component and two chroma components into interlaced 4:2:0 format video signals includes applying vertical-direction filtering to pixels in a first chroma field of the interlaced 4:2:2-format video signals by use of a first downsampling low-pass filter to perform downsampling to produce a first chroma field of the interlaced 4:2:0-format video signals, and applying vertical-direction filtering to pixels in a second chroma field of the interlaced 4:2:2-format video signals by use of a second downsampling low-pass filter obtained by reversing an order of coefficients of the first downsampling low-pass filter to perform downsampling to produce a second chroma field of the interlaced 4:2:0-format video signals, wherein the first downsampling low-pass filter has such a group delay that a modulo-1 remainder of the group delay at frequency ω=0 is substantially equal to 0.25, wherein the first downsampling low-pass filter is designed together with an associated upsampling low-pass filter such that the first downsampling low-pass filter and the upsampling low-pass filter satisfy perfect reconstruction filter bank condition within a predetermined error tolerance range, and such that a sum of the group delay of the first downsampling low-pass filter and a group delay of a normalized filter obtained by making a sum of all coefficients of the upsampling low-pass filter equal to 1 is substantially equal to an integer number at frequency ω=0 within a predetermined error tolerance range.

According to one embodiment, a signal processing method of converting interlaced 4:2:0-format video signals including a luminance component and two chroma components into interlaced 4:2:2 format video signals includes applying vertical-direction filtering to pixels in a first chroma field of the interlaced 4:2:0-format video signals by use of a first upsampling low-pass filter to perform upsampling to produce a first chroma field of the interlaced 4:2:2-format video signals, and applying vertical-direction filtering to pixels in a second chroma field of the interlaced 4:2:0-format video signals by use of a second upsampling low-pass filter obtained by reversing an order of coefficients of the first upsampling low-pass filter to perform upsampling to produce a second chroma field of the interlaced 4:2:2-format video signals, wherein the first upsampling low-pass filter is designed together with an associated downsampling low-pass filter such that the first upsampling low-pass filter and the downsampling low-pass filter satisfy perfect reconstruction filter bank condition within a predetermined error tolerance range, such that the downsampling low-pass filter has such a group delay that a modulo-1 remainder of the group delay at frequency ω=0 is substantially equal to 0.25, and such that a sum of the group delay of the downsampling low-pass filter and a group delay of a normalized filter obtained by making a sum of all coefficients of the first upsampling low-pass filter equal to 1 is substantially equal to an integer number at frequency ω=0 within a predetermined error tolerance range.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Broadcast equipment relays video signals successively from one location to another location. In such a case, the video signals may be encoded and decoded repeatedly because of the editing of tickers or the use of a switching apparatus for switching video signals at each location. To this end, an inexpensive 4:2:0-format-compatible encoder/decoder may be used.

Figure 1A:
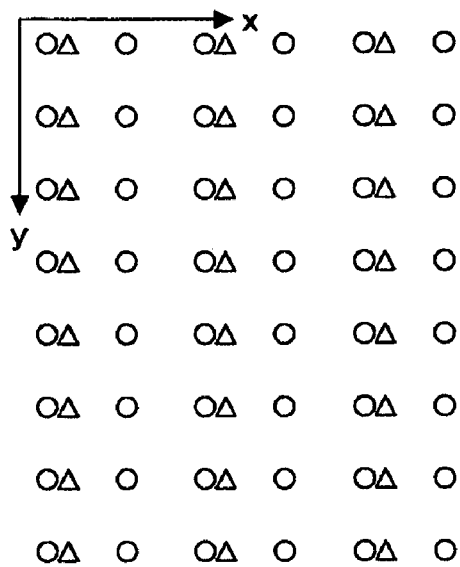
FIGS. 1A through 1D are drawings illustrating the 4:2:2 format and the 4:2:0 format.
Figure 1B:
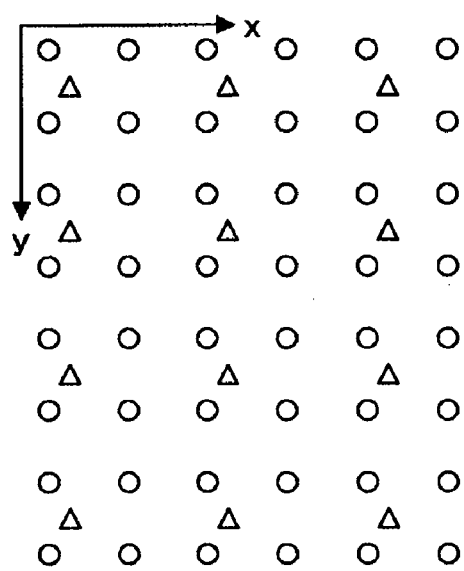
Figure 1C:
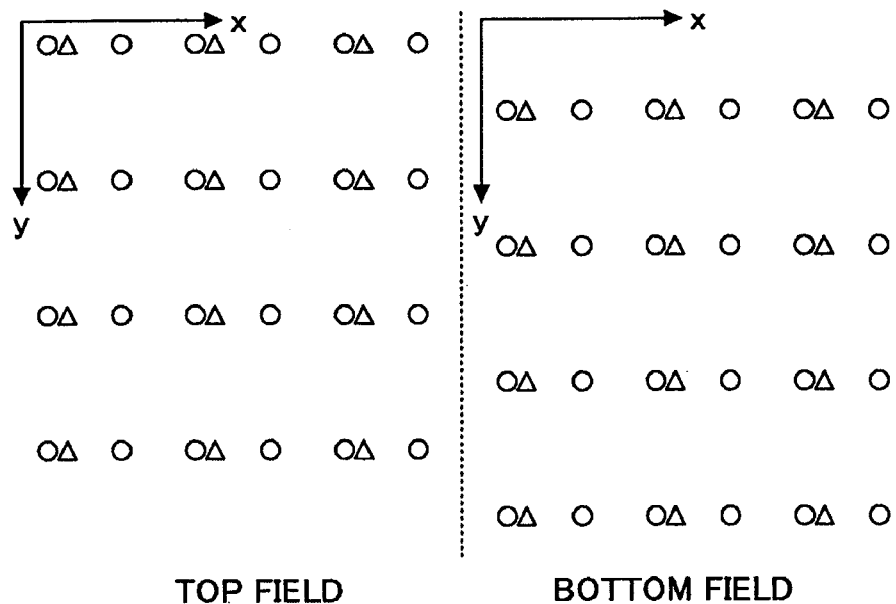
Figure 1D:
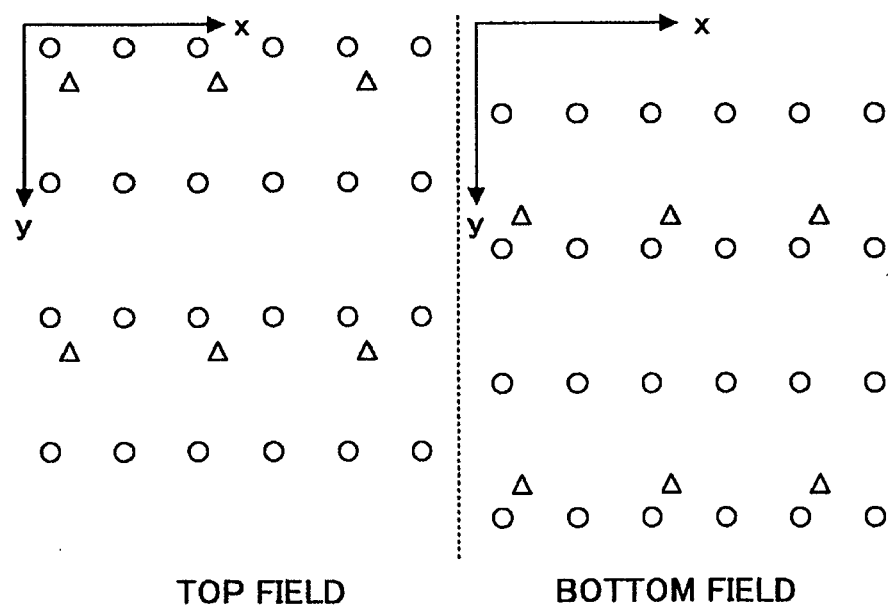
Figure 2:
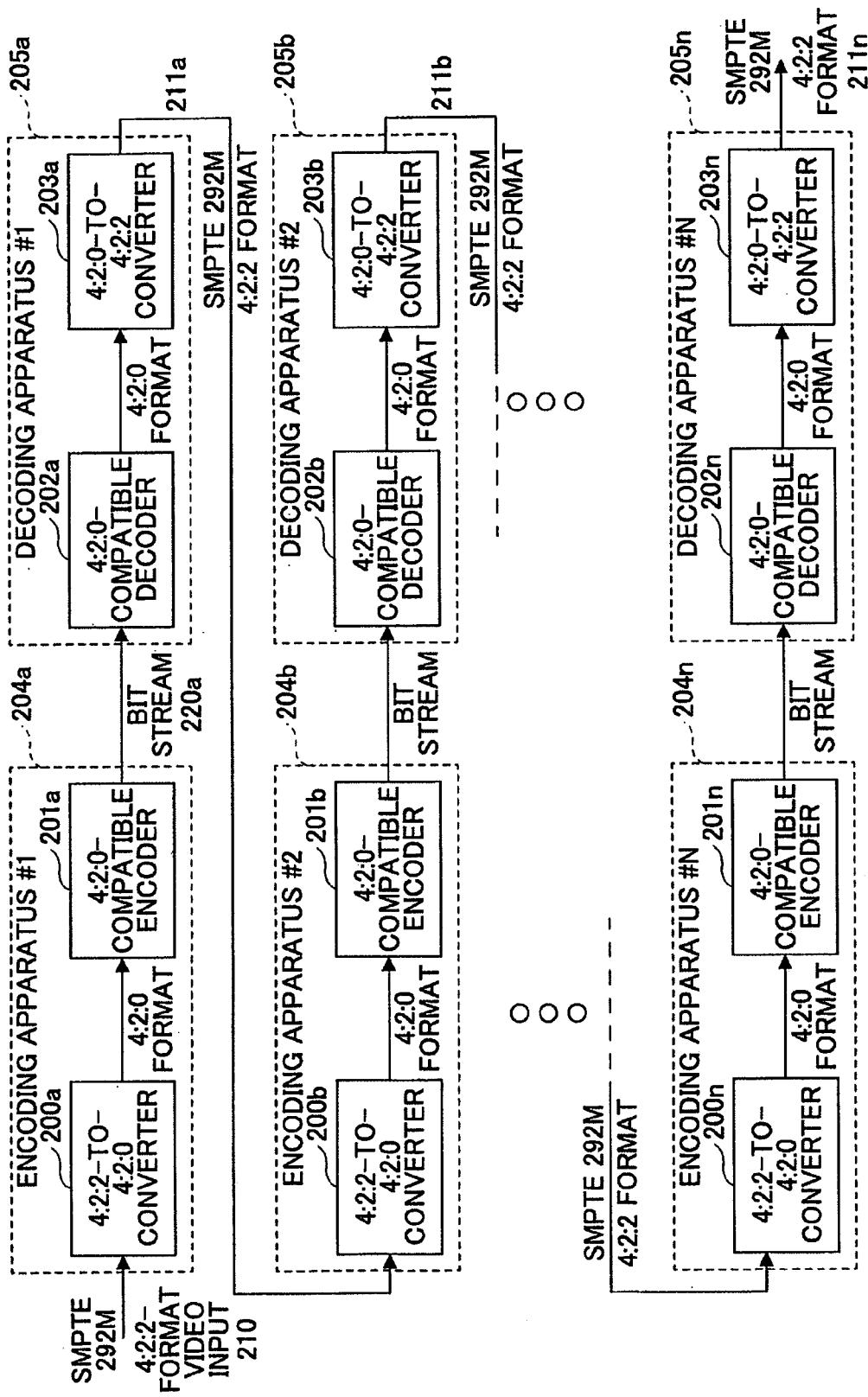
FIG. 2 is a drawing illustrating 4:2:0 encoders that are serially cascaded.

FIG. 2 is a drawing illustrating the use of 4:2:0-format-compatible encoders/decoders. The configuration illustrated in FIG. 2 includes encoding apparatuses 204a through 240n and decoding apparatuses 205a through 205n. In the encoding apparatuses 204a through 240n, 4:2:2-to-4:2:0 converters 200a through 200n and 4:2:0-format-compatible encoders 201a through 201n are provided, respectively. In the decoding apparatuses 205a through 205n, 4:2:0-format-compatible decoders 202a through 202n and 4:2:0-to-4:2:2 converters 203a through 203n are provided, respectively.

A 4:2:2-format video input 210 is provided as SMPTE 292M format signals, i.e., by use of the HD-SDI. This video input is applied to the first encoding apparatus 204a. In the encoding apparatus 204a, the 4:2:2-to-4:2:0 converter 200a converts the video signals in the 4:2:2 format into video signals in the 4:2:0 format. These 4:2:0-format video signals are then encoded by the 4:2:0-format-compatible encoder 201a to produce a bit stream 220a. This bit stream is decoded by the 4:2:0-format-compatible decoder 202a in the first decoding apparatus 205a to produce 4:2:0-format video signals. These 4:2:0-format video signals are supplied to the 4:2:0-to-4:2:2 converter 203a, which then outputs 4:2:2-format video signals 211a. In a system that includes serially-cascaded encoding apparatuses and decoding apparatuses, the 4:2:2-format video signals 211a are supplied to the second encoding apparatus 204b, and, then, the second decoding apparatus 205b produces 4:2:2-format video signals 211b. Such encoding and decoding processes are repeated as many times as there are cascaded stages. In such a system, the cascaded encoders and decoders that are 4:2:0-format-compatible repeatedly perform conversions between the 4:2:2 format and the 4:2:0 format. As the number of cascaded stages increases, blurring in chroma components increases. This is especially so with respect to the 4:2:2-format signals 211n obtained at the last stage. Since each field of interlaced scanning is comprised of pixels arranged on every other line on screen, an apparent range in which filtering affects becomes twice as large as that of the progressive scanning. Because of this, the problem of blurring is especially conspicuous in the case of interlaced scanning. Against this background, Patent Document 1 discloses providing two sets of conversion filters, i.e., a cascade-connection-purpose (i.e., editing-purpose) conversion filter set comprised of a 4:2:2-to-4:2:0 conversion filter and a 4:2:0-to-4:2:2 conversion filter and a normal conversion filter set comprised of a 4:2:2-to-4:2:0 conversion filter and a 4:2:0-to-4:2:2 conversion filter. The normal filters are used in the case of normal encoding and decoding, and the cascade-connection purpose filters are used in the case of cascading encoding apparatuses and decoding apparatuses. A further disclosure is given with respect to a technology that conveys, from an encoder to a decoder, information indicative of which one of the "normal" filters and the "cascade-connection-purpose" filters is used, or multiplexes such information in a stream. Patent Document 1 discloses in paragraph 0040 that the editing-purpose 420-to-422 converter and the editing-purpose 422-to-420 converter may be designed by use of the same method as perfect reconstruction filter banks. This means that no video degradation occurs in spite of cascaded connections by satisfying the perfect reconstruction filter bank condition defined in the sub-band filter theory as in the following, wherein the z transform of a downsampling low-pass filter for converting the 4:2:2 format into the 4:2:0 format is denoted as A(z) (corresponding to H(z) used in Patent Document 1) and the z transform of an upsampling low-pass filter for converting the 4:2:0 format into the 4:2:2 format is denoted as P(z) (corresponding to G(z) used in Patent Document 1).

$$P(1)=2 \tag{1a}$$

$$A(1)=1 \tag{1b}$$

$$A(z) \cdot P(z) + A(-z) \cdot P(-z) = 2 \cdot z^{-2N} \tag{1c}$$

N is any integer number. By use of the substitution "A(z)= Z·A'(z)" in equation (1c), the following is obtained.

$$Z \cdot A'(z) \cdot P(z) + (-z) \cdot A'(z) \cdot P(z) = 2 \cdot z^{-2N} \tag{1d}$$

Generality will not be lost by replacing A'(z) with A(z). After such replacement, all the terms appearing in the above equation are divided by z to derive the following equation, which may be used in place of equation (1c) in some documents.

$$A(z) \cdot P(z) - A(-z) \cdot P(-z) = 2 \cdot z^{-2N-1} \tag{1e}$$

N is any integer number. Equation (1c) and equation (1e) are equivalent to each other as perfect reconstruction filter bank condition. Namely, the fact that the downsampling low-pass filter A(z) and the upsampling low-pass filter P(z) satisfy the perfect reconstruction filter bank condition is the same as the fact that either equation (1c) or equation (1e) is satisfied. The z transform F(z) of a filter F having f(n) as the n-th tap coefficient is represented as follows.

$$F(z) = \Sigma f(k) \cdot z^{-k} \tag{2}$$

With the use of filters satisfying the above-noted conditions, high-frequency components are inevitably degraded in the first-stage 4:2:2-to-4:2:0 conversion, but blurring will not spread more than the blurring of the output signals of the first stage even if a 4:2:0-to-4:2:2 conversion and a 4:2:2-to-4:2:0 conversion are repeatedly performed after the first stage.

Figure 3:
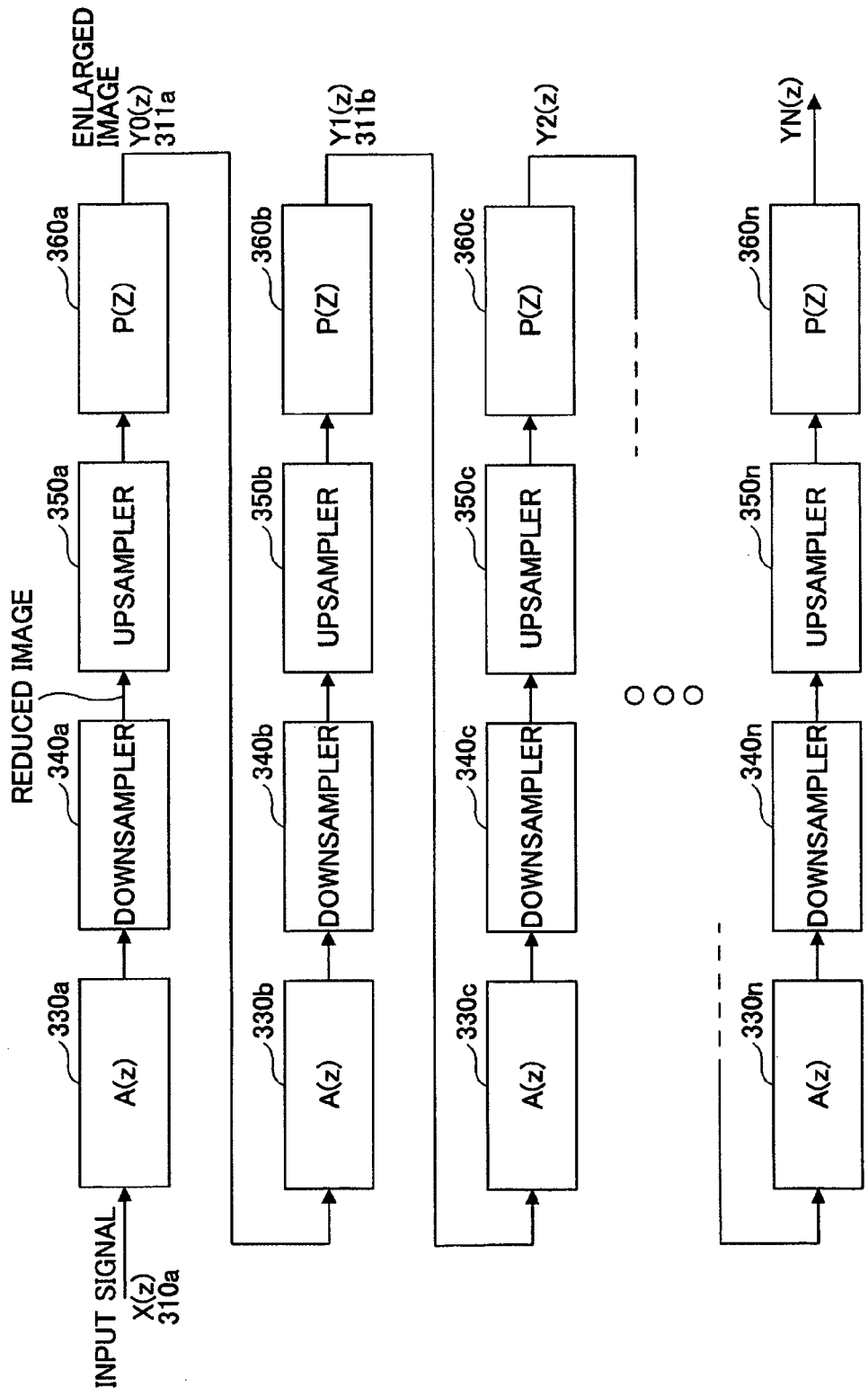
FIG. 3 is a drawing illustrating a cascade connection of perfect reconstruction filters.

FIG. 3 is a drawing illustrating a cascade connection of perfect reconstruction filters. The configuration illustrated in FIG. 3 includes downsampling low-pass filters 330a through 330n, downsamplers 340a through 340n, upsamplers 350a through 350n, and upsampling low-pass filters 360a through 360n. The z transform 310a of an original input signal is denoted as X(z). In the first stage, the downsampling low-pass filter 330a having the z transform A(z) is used for filtering, and the downsampler 340a downsamples by a ratio of 2:1. Thereafter, the upsampler 350a upsamples by a ratio of 1:2. After this, a video signal 311a having the z transform Y0(z) upsampled by the upsampling low-pass filter 360a having the z transform P(z) is obtained as follows.

$$Y0(z) = \frac{1}{2} \cdot P(z) \cdot (A(z) \cdot X(z) + A(-z) \cdot X(-z)) \tag{3}$$

Thereafter, the downsampling low-pass filter 330b having the z transform A(z) performs filtering with respect to Y0(z), followed by the downsampler 340b and the upsampler 350b, and then the upsampling low-pass filter 360b having the z transform P(z) performing upsampling to produce a video signal 311b having the z transform Y1(z) as follows.

$$\begin{aligned} Y1(z) &= 1/2 \cdot P(z) \cdot (A(z) \cdot Y0(z) + A(-z) \cdot Y0(-z)) \\ &= 1/4 \cdot P(z) \cdot A(z) \cdot (\cdot P(z) \cdot (A(z) \cdot X(z) + \\ &\quad A(-z) \cdot X(-z))) + 1/4 \cdot P(z) \cdot A(-z) \cdot \\ &\quad (\cdot P(-z) \cdot (A(-z) \cdot X(-z) + A(z) \cdot X(z))) \\ &= 1/4 \cdot P(z) \cdot (A(z) \cdot P(z) - A(-z) \cdot P(-z)) \cdot \\ &\quad (A(z) \cdot X(z) + A(-z) \cdot X(-z)) \\ &= z^{-2N} \cdot 1/2 \cdot P(z) \cdot (A(z) \cdot Y0(z) + A(-z) \cdot Y0(-z)) \\ &= z^{-2N} \cdot Y0(z) \end{aligned} \tag{4}$$

In the transformations of expressions noted above, equation (1c) is used. The term $z^{-2N}$ represents a fixed delay of a signal equal to 2N. Accordingly, it has been shown that Y1(z) is equal to Y0(z), except for a fixed delay of 2N. Since Y0(z) and Y1(z) are equal to each other, an image obtained after performing image reduction and enlargement by use of A(z) and P(z) is equal to Y0(z) no matter how many times such a process is repeated to obtain Y2(z), Y3(z), . . . , YN(z).

Upsampling of pixels by a ratio of 1:2 using the upsampling low-pass filter P(z) is performed by first inserting zero after each pixel, thereby converting an N-pixel reduced image into a 2N-pixel image. The upsampling low-pass filter is then applied to this 2N-pixel image to produce a 2N-pixel upsampled image.

The above-described method is equivalent to the following process. An interpolation filter Pe(z) having the even-numbered coefficients of the upsampling low-pass filter P(z) and an interpolation filter Po(z) having the odd-numbered coefficients of the upsampling low-pass filter P(z) are constructed as follows.

$$Pe(z)=½·(P(z^{1/2})+P(-z^{1/2})) \qquad (5a)$$

$$Po(z)=½·(P(z^{1/2})+P(-z^{1/2}))·z^{1/2} \qquad (5b)$$

Then, the pixels on the lower-order side of the enlarged image are subjected to interpolation by Pe(z), and the pixels on the upper-order side of the enlarged image are subjected to interpolation by Po(z).

In the following, a description will be given of what sort of relationships may preferably be satisfied by chroma pixel positions between before and after conversion with respect to a 4:2:2-to-4:2:0 format conversion and a 4:2:0-to-4:2:2 format conversion. As a background explanation, a description will first be given with regard to how large a positional displacement occurs for a pixel after filtering relative to an original pixel position. In order to represent a phase shift of the original signal, group delay characteristics will be used. The frequency characteristics of filter F are represented as follows.

$$F(\omega)=Fre(\omega)+j·Fim(\omega) \qquad (6)$$

F(ω) is the filter frequency characteristics with respect to frequency ω, and is obtained by using the substitution $z=e^{j\omega}$ in the z transform (i.e., a polynomial of z) of the filter. Here, j is the imaginary unit. Fre(ω) is the real part of F(ω), and Fim(ω) is the imaginary part of F(ω). Group delay characteristics GDC(ω) of the filter F(ω) with respect to frequency ω are represented as follows.

$$GDC(\omega)=d(\tan^{-1}(Fim(\omega)/Fre(\omega)))/d\omega \qquad (7)$$

Such group delay characteristics represent how large a positional shift in terms of numbers of pixels occurs with respect to the frequency component of frequency ω after filtering. If GDC(ω) is α, for example, the frequency component of frequency ω is shifted by α pixels after filtering relative to the original signal. Since low frequency components are important in video signals, the values of group delay characteristics in low frequencies are what matters, especially near the point where ω=0.

Multiplication of all the terms of the z transform of a filter by $z^{-1}$ to the power of n (n: any integer number) is equivalent to the introduction of a fixed delay of n into the values obtained by filtering. That is, the values after the filtering are not affected by such multiplication, except for the introduction of the delay. Further, the multiplication of the filter by $z^{-1}$ to the power of n results in the group delay being increased by integer n. It follows that only the fractional part of the value of the group delay matters. In the following, $z^{-1}$ to the power of a number properly selected is multiplied such that the value of the group delay of the filter assumes a value larger than or equal to 0 and smaller than 1. Namely, the group delay of the z transform of a filter is obtained first, followed by adding a properly selected integer number to obtain the sum that is larger than or equal to 0 and smaller than 1. Such a sum is then used as the group delay of this filter. This process is equivalent to obtaining a modulo-1 remainder. In the following, this process is referred to as a process of "obtaining a modulo-1 remainder" When the group delay of a given filter is computed as 2.5, for example, a modulo-1 remainder is derived such that the remainder is equal to or greater than 0 and smaller than 1. Namely, 2 is subtracted to obtain a group delay of 0.5. When the group delay of a given filter is computed as −0.7, for example, a modulo-1 remainder is derived such that the remainder is equal to or greater than 0 and smaller than 1. Namely, 1 is added to obtain a group delay of 0.3.

A simple way to derive a group delay with respect to ω=0 is to use the following formula wherein filter coefficients are denoted as f(n), and the sum of the coefficients is assumed to be 1.

$$GDC(0)\sim\Sigma f(k)·k \qquad (8)$$

In the following, a description will be given of what group delay characteristics may preferably be provided for a filter for downsampling chroma signals from the interlaced 4:2:2 format to the interlaced 4:2:0 format with reference to FIG. 4A.

Figure 4A:
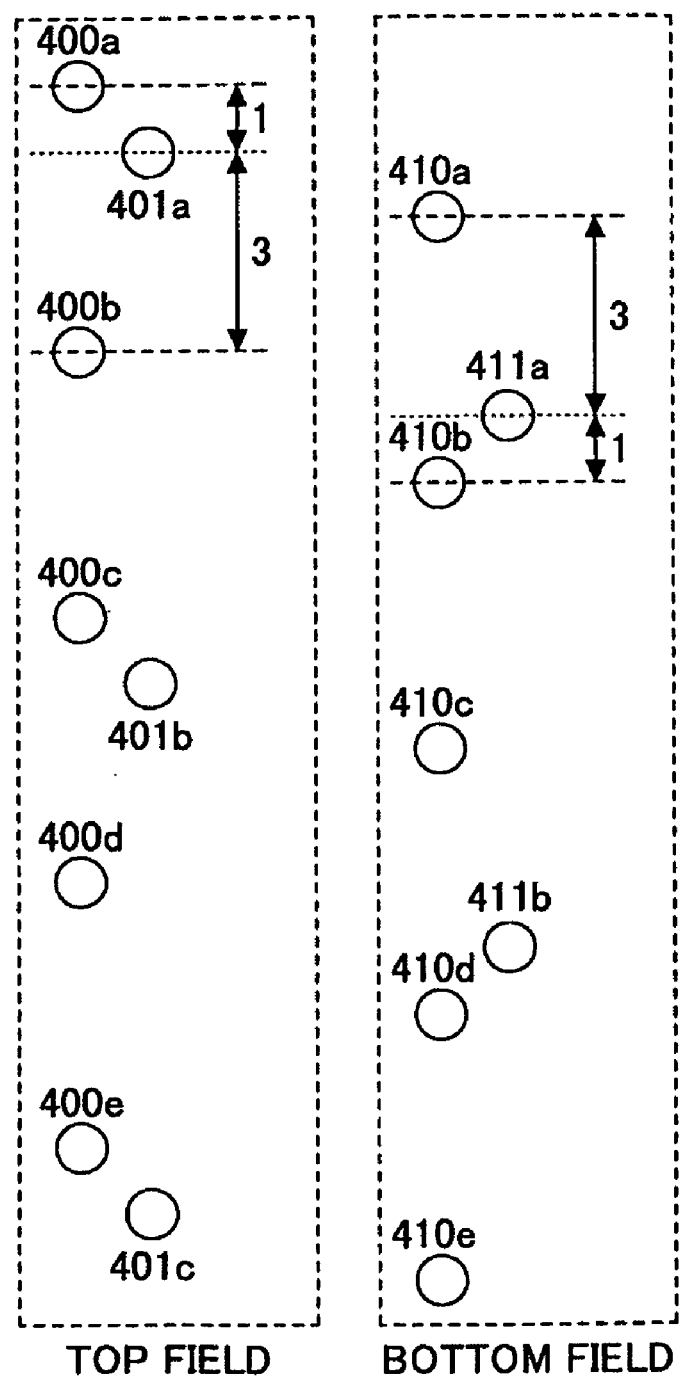
FIGS. 4A and 4B are drawings for explaining positional relationships between chroma pixels at the time of format conversion between the 4:2:2 format and the 4:2:0 format by use of preferable filters.

FIG. 4A illustrates 4:2:2 chroma pixels 400a through 400e and 4:2:0 chroma pixels 401a through 401c in the top field, and illustrates 4:2:2 chroma pixels 410a through 410e and 4:2:0 chroma pixels 411a and 411b in the bottom field. In the top field, the 4:2:0 chroma pixel 401a may preferably assume a value of the point that divides the interval between the 4:2:2 chroma pixel 400a and the 4:2:2 chroma pixel 400b by a ratio of 1:3 from the top, i.e., a value of the point that is shifted by ¼ pixel from the top. Accordingly, the group delay characteristics of the downsampling filter for the top field may preferably assume a value close to (i.e., substantially equal to) ¼ in the vicinity of ω=0. In the bottom field, the 4:2:0 chroma pixel 411a may preferably assume a value of the point that divides the interval between the 4:2:2 chroma pixel 410a and the 4:2:2 chroma pixel 410b by a ratio of 3:1 from the top, i.e., a value of the point that is shifted by ¾ pixel from the top. Accordingly, the group delay characteristics of the downsampling filter for the bottom field may preferably assume a value close to (i.e., substantially equal to) ¾ in the vicinity of ω=0. Further, a description will be given of what characteristics may preferably be provided for a filter for upsampling from the 4:2:0 format to the 4:2:2 format with reference to FIG. 4B.

Figure 4B:
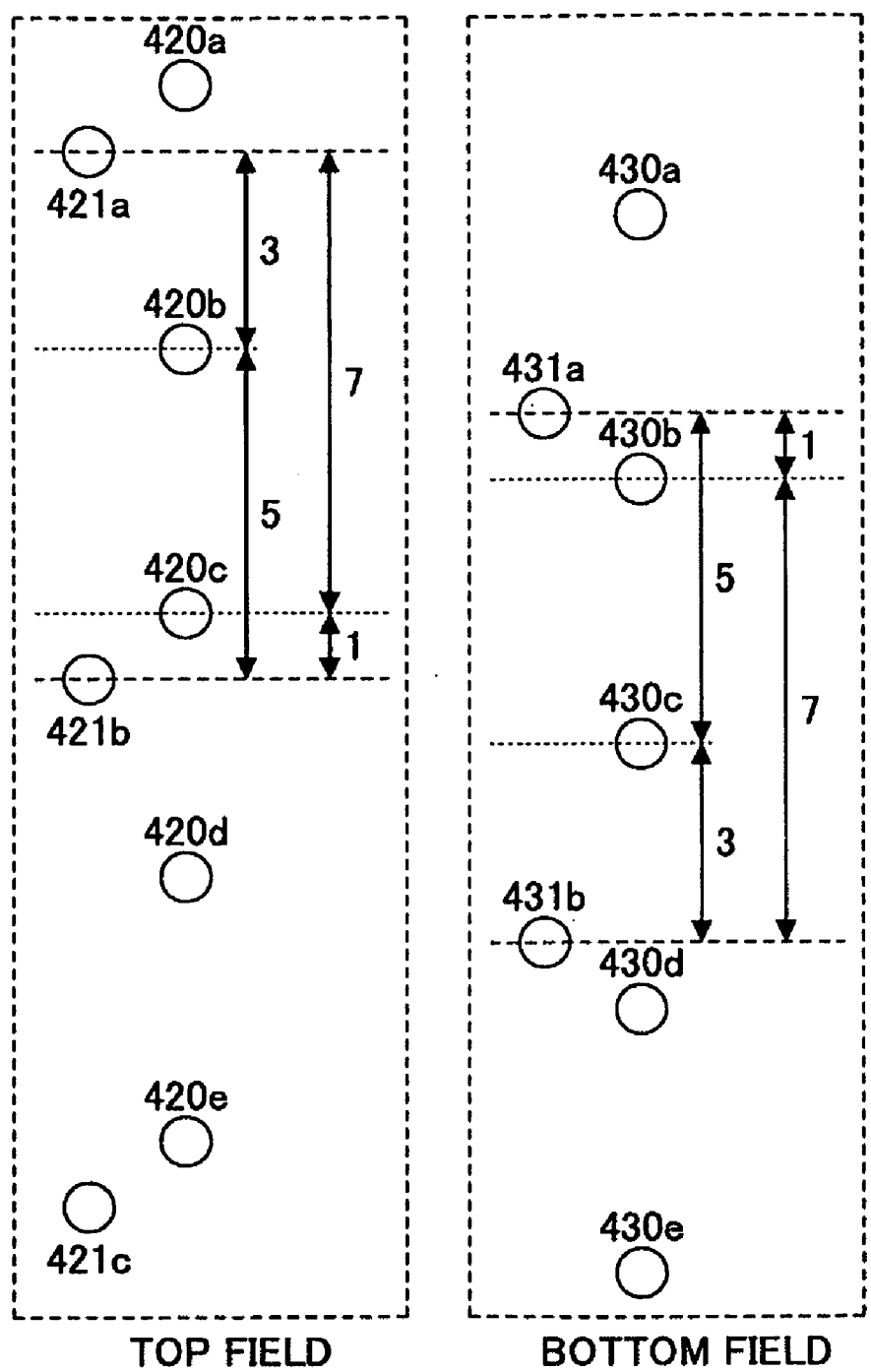

FIG. 4B illustrates 4:2:2 chroma pixels 420a through 420e and 4:2:0 chroma pixels 421a through 421c in the top field, and illustrates 4:2:2 chroma pixels 430a through 430e and 4:2:0 chroma pixels 431a and 431b in the bottom field. The 4:2:2 chroma pixel 420b is situated at the point that divides the interval between 4:2:0 chroma pixels 421a and 421b by a ratio of 3:5 from the top, i.e., at the point that is shifted by ⅜ pixels from the top. The 4:2:420 chroma pixel 420c is situated at the point that divides the interval between 4:2:0 chroma pixels 421a and 421b by a ratio of 7:1 from the top, i.e., at the point that is shifted by ⅞ pixels from the top. These filtering processes correspond to filters Pe(z) and Po(z), respectively. Accordingly, the group delay of Pe(z) with respect to ω=0 may preferably be close to (i.e., substantially equal to) ⅜, and the group delay of Po(z) with respect to ω=0 may preferably be close to (i.e., substantially equal to) ⅞. The characteristics of Pe(z) and Po(z) may be reversed depending on the definition of P(z). In z transform, however, only the pixel that serves as the basis for group delay is shifted in response to a change in the order of z. P(z) is thus configured such that the group delays of Pe(z) and Po(z) with respect to ω=0 are ⅜ and ⅞, respectively. The configuration of the bottom field is equal to that of the top field turned upside down. Namely, the 4:2:2 chroma pixel 430b is situated at the point that divides the interval between 4:2:0 chroma pixels 431a and 431b by a ratio of 1:7 from the top, i.e., at the point that is shifted by ⅛ pixels from the top. Further, the 4:2:2 chroma pixel 430c is situated at the point that divides the interval between 4:2:0 chroma pixels 431a and 431b by a ratio of 5:3 from the top, i.e., at the point that is shifted by ⅝ pixels from the top.

Patent Document 1 discloses two sets of examples of A(z) and P(z) that are expressed as following formulas (9a) and (9b) as well as formulas (10a) and (10b).

$$A(z)=-0.125z^{-1}+0.25z^{-2}+0.75z^{-3}+0.25z^{-4}-0.125z^{-5} \quad (9a)$$

$$P(z)=0.5+z^{-1}+0.5z^{-2} \quad (9b)$$

$$A(z)=1 \quad (10a)$$

$$P(Z)=1+z-1 \quad (10b)$$

The perfect reconstruction filters as defined by expressions (9a) and (9b) and expressions (10a) and (10b) in Patent Document 1, however, are not suitable for conversion from the 4:2:2 format into the 4:2:0 format. The technology disclosed in Patent Document 1 is thus characterized by the selective use of either a "normal" filter providing superior display quality but failing to satisfy the perfect reconstruction filter bank condition thereby to create image blurring in the case of cascade connections or a "cascade-connection-purpose" filter providing inferior display quality but satisfying the perfect reconstruction filter bank condition thereby to be free from image blurring even in the case of cascade connections.

In the following, a description will be given of why the filters disclosed in Patent Document 1 are not superior in terms of display quality by focusing attention on expressions (9a) and (9b). Downsampling low-pass filter A(z) defined by expression (9a) has a group delay of 0 with respect to ω=0 according to formula (7).

As for upsampling low-pass filter P(z), Pe(z) and Po(z) are obtained as follows by using expression (9b) in formulas (5a) and (5b).

$$Pe(z)=0.5+0.5z^{-1} \quad (11a)$$

$$Po(z)=1 \quad (11b)$$

When the group delay characteristics of Pe(z) and Po(z) are computed according to formula (7), the group delay of Pe(z) with respect to ω=0 is 0.5, and the group delay of Po(z) with respect to ω=0 is 0.

Figure 5A:
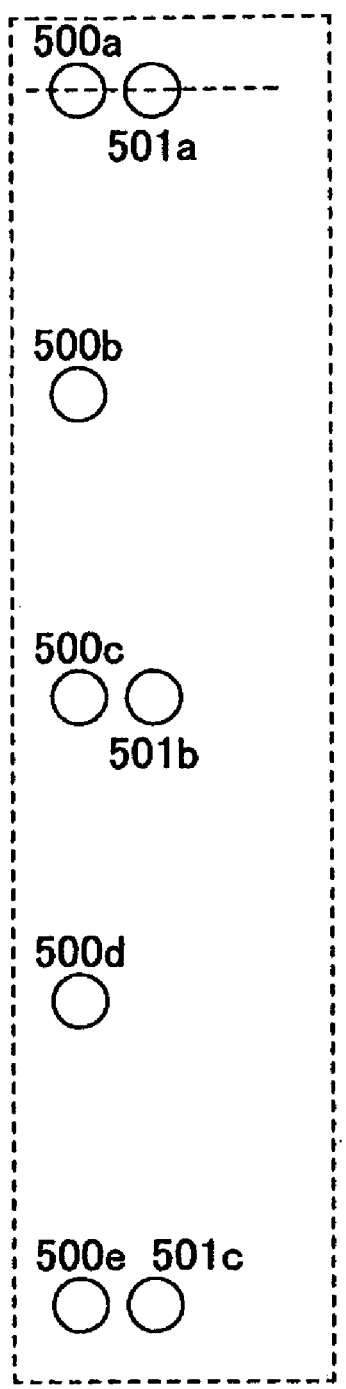
FIGS. 5A and 5B are drawings for explaining positional relationships between chroma pixels at the time of format conversion between the 5:2:2 format and the 4:2:0 by use of expressions (9a) and (9b)
Figure 5B:
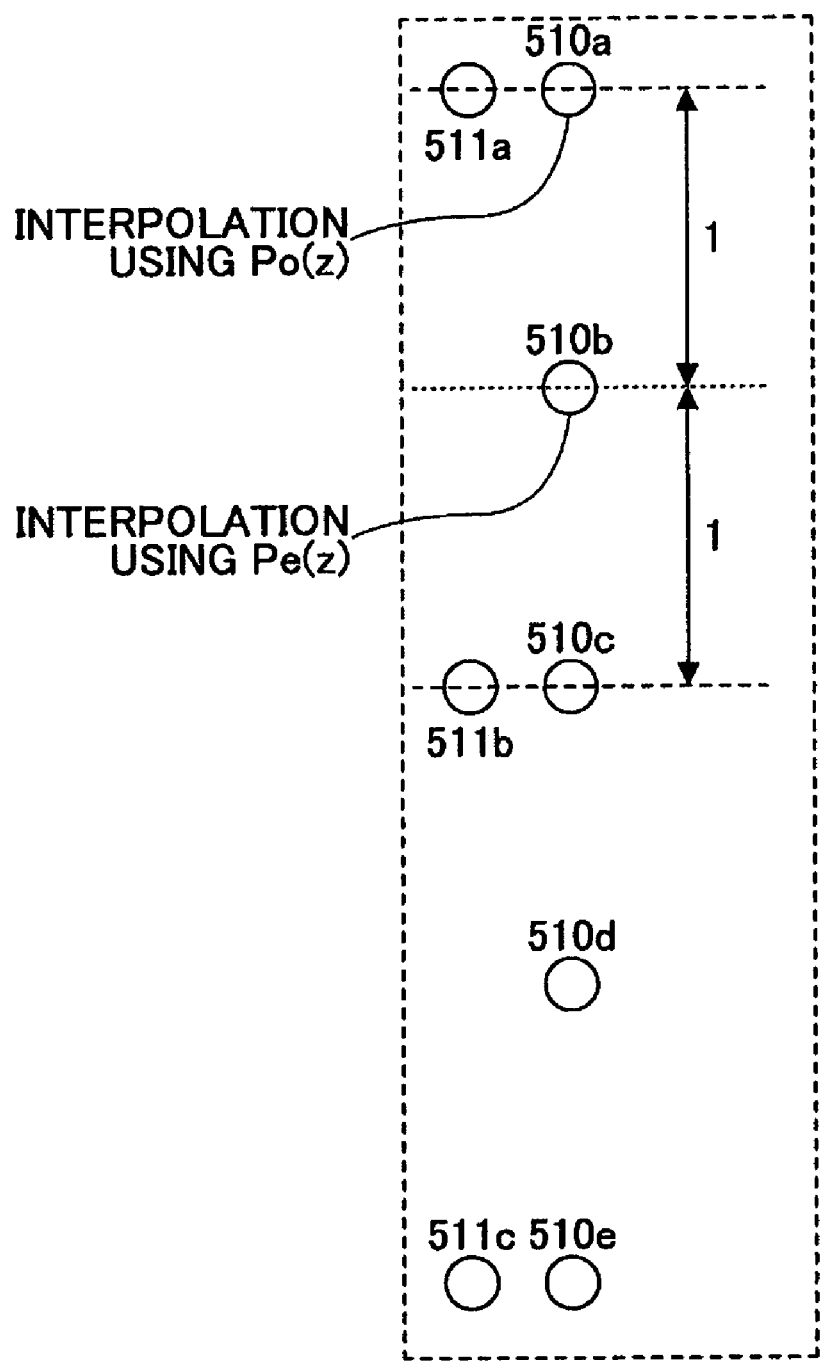

In the following, a description will be given of how a pixel is shifted after filtering by referring to FIGS. 5A and 5B. FIG. 5A illustrates the positions of 4:2:2 chroma pixels 500a through 500e and 4:2:0 chroma pixels 501a through 501c as obtained by downsampling using a filter of expression (9a). Since the group delay of this filter is 0, the 4:2:0 chroma pixel 501a after downsampling is situated at the same position as the 4:2:2 chroma pixel 500a. FIG. 5B illustrates the positions of 4:2:0 chroma pixels 511a through 511c and 4:2:2 chroma pixels 510a through 510e as obtained by upsampling using a filter of expression (9b). Since the group delay of Pe(z) is 0.5, the 4:2:2 chroma pixel 510b as interpolated by Pe(z) is situated at the point that divides the interval between two 4:2:0 chroma pixels 511a and 511b by a ratio of 1:1. Further, since the group delay of Po(z) is 0, the pixel 501a as interpolated by this filter is situated at the same position as the 4:2:0 pixel 511a. The group delay characteristics of the downsampling and upsampling filters illustrated in FIGS. 5A and 5B differ from the desirable group delay characteristics of filters as illustrated in FIGS. 4A and 4B. When an upsampling filter having normal preferable characteristics for converting the 4:2:0 format into the 4:2:2 format, i.e., a filter having Pe(z) with a group delay of ⅜ with respect to ω=0 and Po(z) with a group delay of ⅞ with respect to ω=0, is used to upsample the 4:2:0-format video that has been obtained by downsampling the 4:2:2-format chroma signals by use of a filter of equation (9a), chroma pixels are situated at positions as illustrated in FIG. 6A and FIG. 6B by combining FIGS. 4A and 4B and FIGS. 5A and 5B.

Figure 6A:
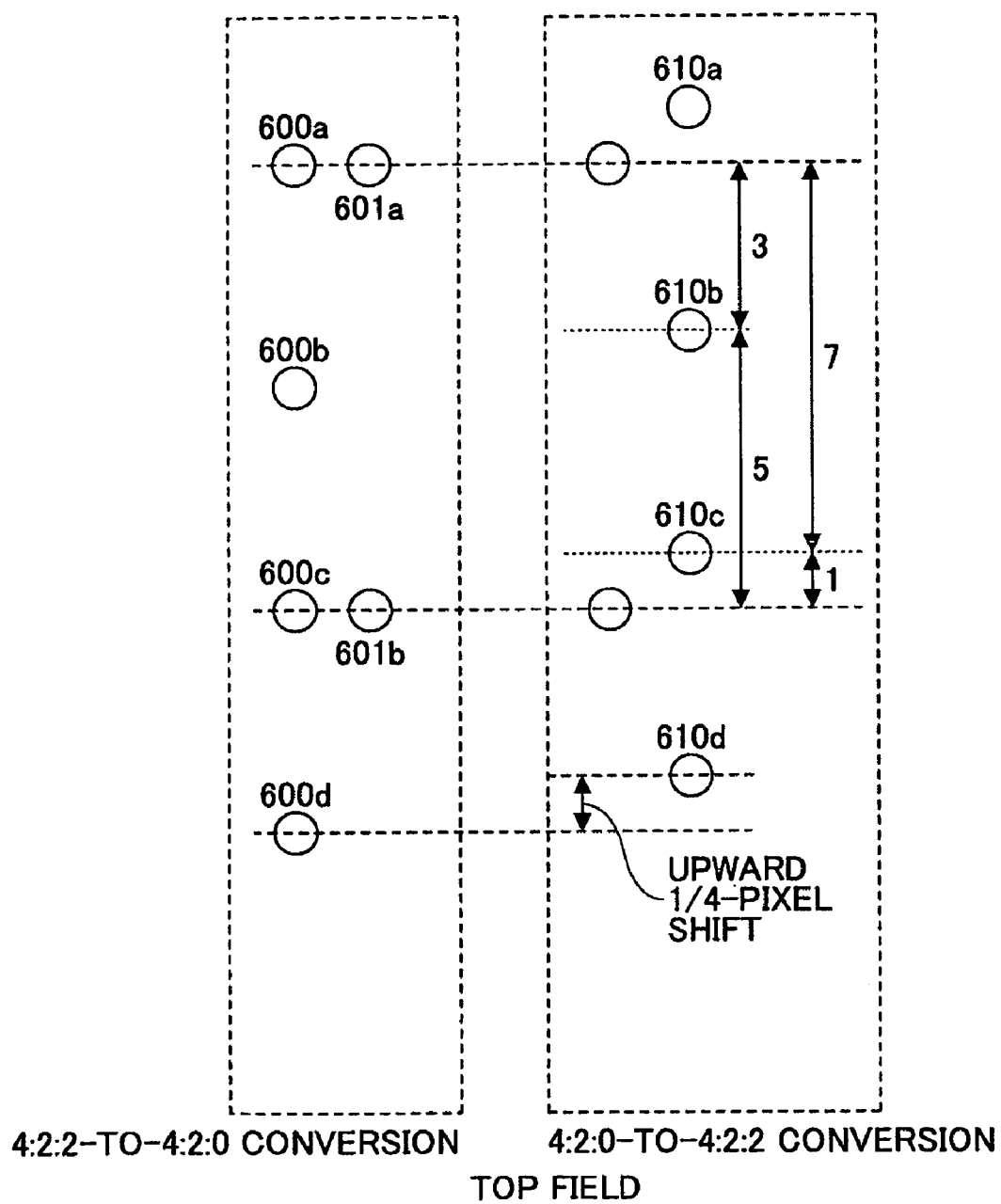
FIGS. 6A and 6B are drawings for explaining positional relationships between chroma pixels obtained when a downsampling low-pass filter defined by expression (9a) and a normal upsampling low-pass filter are employed.
Figure 6B:
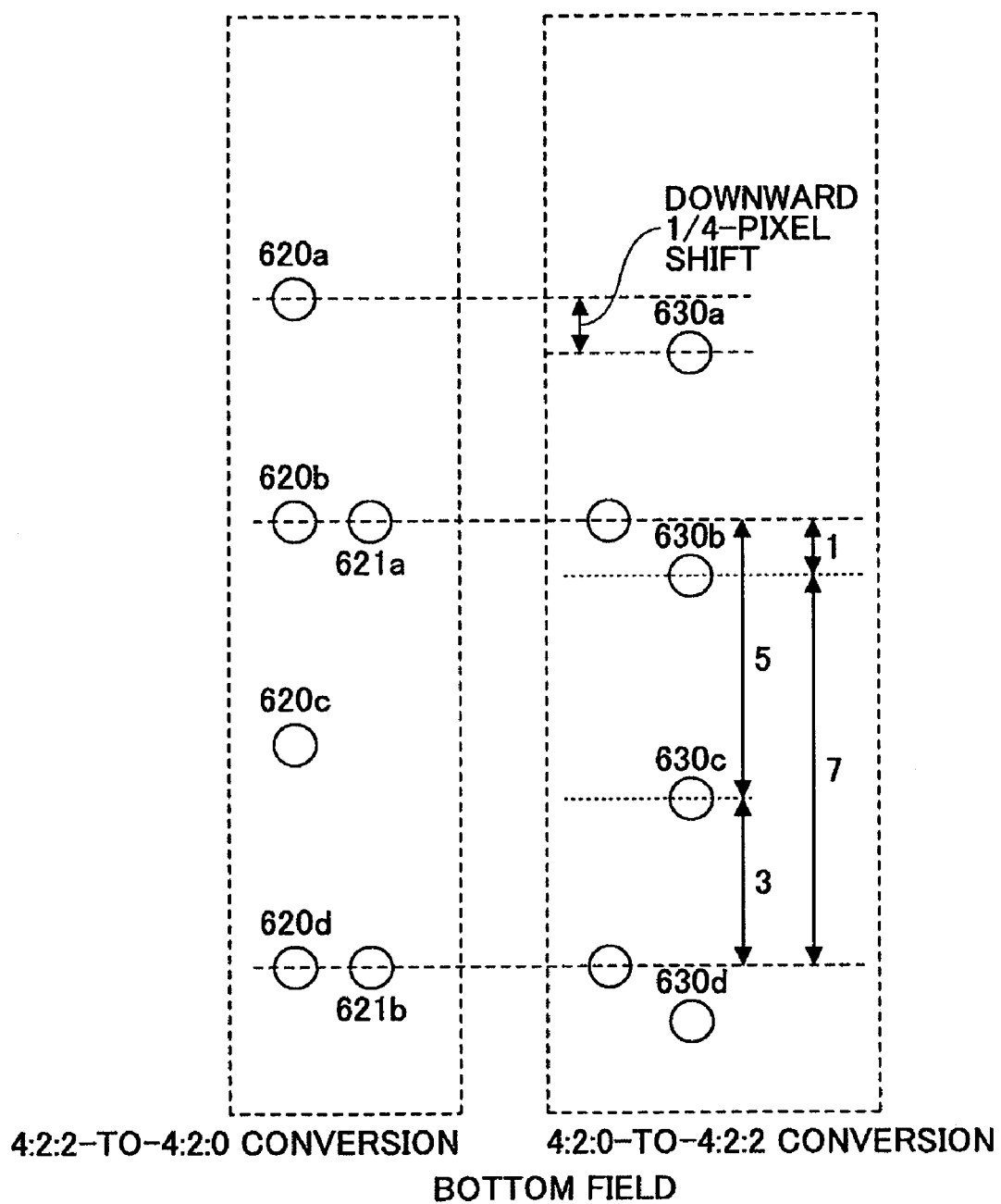
Figure 7:
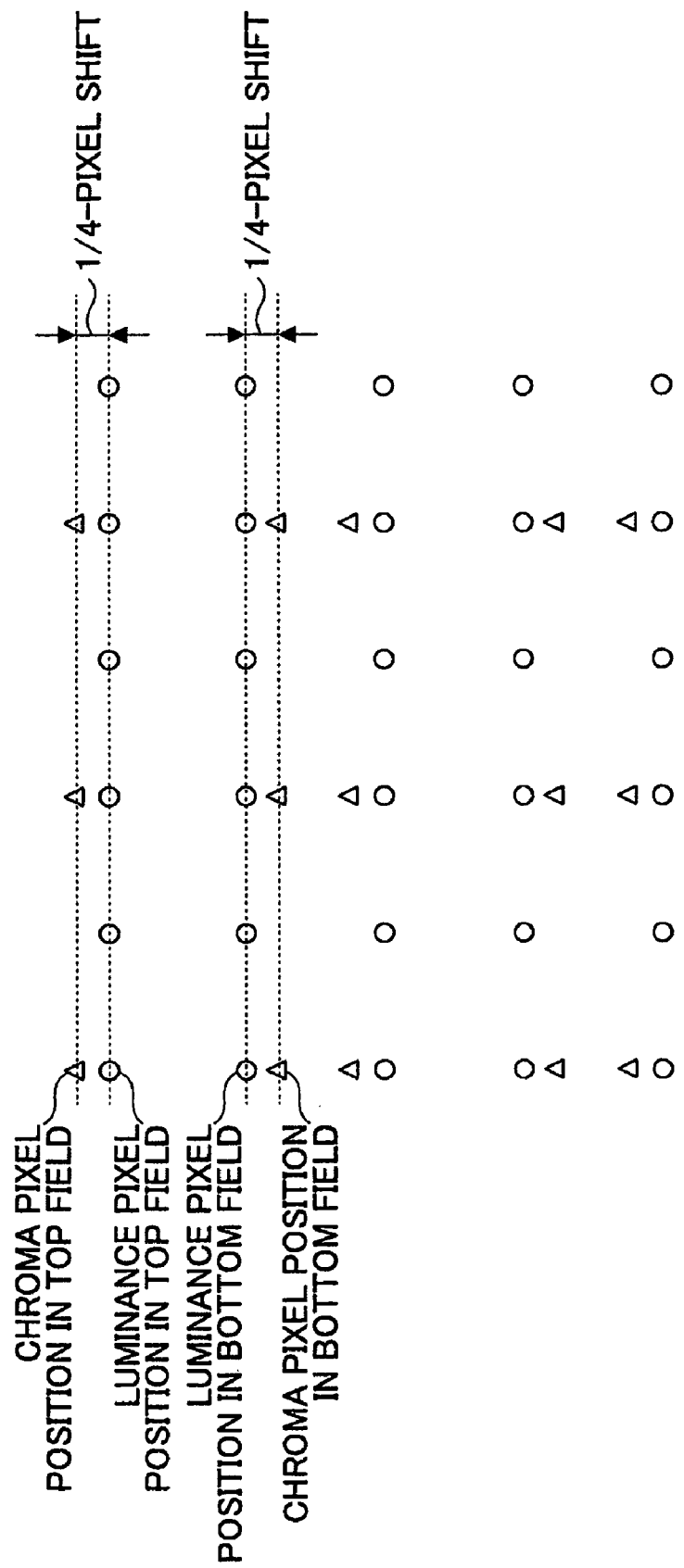
FIG. 7 is a drawing for explaining the problem of positional displacements of chroma pixels in a 4:2:2-format image when a downsampling low-pass filter defined by expression (9a) and a normal upsampling low-pass filter are employed.

FIG. 6A illustrates 4:2:2 chroma pixel positions 600a through 600d as originally given, chroma pixel positions 601a and 601b as obtained by downsampling using expression (9a), and chroma pixel positions 610a through 610d as obtained by upsampling using a normal filter. FIG. 6B illustrates 4:2:2 chroma pixel positions 620a through 620d as originally given, chroma pixel positions 621a and 621b as obtained by downsampling using expression (9a), and chroma pixel positions 630a through 630d as obtained by upsampling using a normal filter. When a filter having normal preferable characteristics upsamples after downsampling performed by a filter of expression (9a), a pixel obtained after the 4:2:2-to-4:2:0 conversion and the 4:2:0-to-4:2:2 conversion is situated in the top field at the position 610d that is shifted upward by ¼ pixel relative to the 4:2:2 chroma pixel 600d of the original image. In the bottom field, a pixel obtained after the 4:2:2-to-4:2:0 conversion and the 4:2:0-to-4:2:2 conversion is situated at the position 630a that is shifted downward by ¼ pixel relative to the 4:2:2 chroma pixel 620a of the original image. Upon being displayed, the positions of luminance pixels and chroma pixels, which are supposed to be at the same vertical position, are displaced by ¼ pixels in the vertical direction as illustrated in FIG. 7, thereby creating visually perceivable artifact.

In the following, a description will be given of a method for evaluating the pixel displacement occurring between before and after downsampling and upsampling when the filters defined by expressions (10a) and (10b) are combined with a conventional filter having preferable characteristics. This evaluation method is based on a point of view different from that of the above-described method. In order to examine the characteristics of expression (10b), the characteristics of a signal obtained by downsampling and upsampling will be examined in the following. To this end, the signal defined in expression (3) obtained by downsampling followed by upsampling is expanded.

$$\tfrac{1}{2} \cdot P(z) \cdot A(z) \cdot X(z) \quad (12)$$

$$\tfrac{1}{2} \cdot P(z) \cdot A(-z) \cdot X(-z) \quad (13)$$

The signal after the expansion includes low-frequency components represented by expression (12) and alias components represented by expression (13) with respect to input signal X(z). The alias components are small in general, so that a predominant factor after filtering is the low-frequency components represented by expression (12). It follows that the group delay of expression (14) may be evaluated to properly ascertain the displacement of pixels between before and after downsampling and upsampling.

$$\tfrac{1}{2} \cdot P(z) \cdot A(z) \quad (14)$$

In video equipment, no positional displacement of pixels between before and after downsampling and upsampling may be tolerable. Accordingly, the group delay of the filter defined by expression (14) with respect to ω=0 may preferably be 0 (or equal to an integer number). It is known to those skilled in the art that filter F(z)G(z) obtained by combining filter F(z)

and filter G(z) has a group delay with respect to ω=0 that is a sum of the group delay of filter F(z) and the group delay of filter G(z) with respect to ω=0. For video equipment, thus, the sum of the group delays of ½P(z) and A(z) with respect to ω=0 may preferably be an integer number. An image downsampled by a preferable filter may be upsampled by a filter defined by expression (10b). In such a case, the group delay of the preferable filter with respect to ω=0 is ¼ as previously described. The group delay of the filter defined by expression (10b) with respect to ω=0 is ½. According to expression (14), the group delay occurring between before and after downsampling and upsampling is ¾, which indicates that pixels are shifted by as much as ¾ pixel through such processing. The use of such a filter creates color misrepresentation relative to the original image, thereby generating visually discernible artifacts that cannot be ignored.

In order to avoid such artifacts, Patent Document 1 discloses using a cascade-connection-purpose filter and a "normal" filter having preferable group delay characteristics as previously described. As has been described heretofore, no filter has been conventionally known that satisfies both the first condition that image degradation does not worsen through cascade connections and the second condition that group delay characteristics equal to those of conventionally used display-purpose or size-reduction-purpose filters are provided. The absence of such a filter necessitates the selective use of either a cascade-connection purpose filter or a display/reduction-purpose filter.

Further, all the perfect reconstruction filters that are conventionally known have the group delay equal to 0 or 0.5. Because of this, when a perfect reconstruction filter is used to downsample in interlaced scanning, the use of the same filter bank for the top and bottom fields to perform a 2:1 division into low-frequency signal L(z) and high-frequency signal H(z) causes the low-frequency signal to have an imperfect arrangement of interlaced scanning line positions. Namely, the pixel distance between the top field and the bottom field as well as the pixel distance between the bottom field and the top field are both unequal. This is described in detail in Non-Patent Document 1. In order to obviate this problem, Patent Document 2 discloses a method of equalizing the distance between the top field and the bottom field after downsampling. This method employs a filter (with even-number taps) satisfying the perfect reconstruction filter bank condition and having a group delay of 0.5 to downsample the top field and a filter (with odd-number taps) satisfying the perfect reconstruction filter bank condition and having a group delay of 0 to downsample the bottom field. However, the group delay characteristics of a desirable filter for converting 4:2:2 chroma into 4:2:0 chroma are equal to 0.25 for the top field and 0.75 (or −0.25) for the bottom field as illustrated in FIG. 4A. Namely, the filter configuration disclosed in Patent Document 2 has a group delay that is 0.25-pixel larger than the desirable filter characteristics for both the top field and the bottom field. When the filter configuration disclosed in Patent Document 2 is used to downsample from the 4:2:2 format to the 4:2:0 format, followed by using a 4:2:0-to-4:2:2 upsample filter having desired characteristics to enlarge video images, displayed video images are undesirably displaced downward by 0.25 pixel.

In the disclosures herein, a signal processing apparatus may advantageously prevent chroma pixels from having positional displacements when an image signal obtained by downsampling an interlaced chroma signal from the 4:2:2 format to the 4:2:0 format by use of a perfect reconstruction filter is displayed by use of a normal filter having preferable group delay characteristics. The applicants of the present application have found that a downsampling low-pass filter A(z) for converting a 4:2:2-format chroma signal into a 4:2:0-format chroma signal and a upsampling low-pass filter P(z) for converting the 4:2:0-format chroma signal into a 4:2:2-format chroma signal can be designed for the top field to simultaneously satisfy the first through fourth conditions defined in the following or simultaneously satisfy the first through third conditions.

First Condition: the downsampling low-pass filter A(z) and the upsampling low-pass filter P(z) satisfy equations (1a), (1b), and either (1c) or (1e). This means that the perfect reconstruction filter bank condition are satisfied. This condition ensures that degradation does not worsen when upsampling and downsampling are serially cascaded.

Second Condition: the downsampling low-pass filter A(z) produces a pixel value of the point that internally divides an interval between each two adjacent pixels by a ratio of 1:3. Namely, the group delay is close to (i.e., substantially equal to) ¼ in the vicinity of or at the point where ω=0. This corresponds to the group delay characteristics of a downsampling filter having preferable characteristics for converting an interlaced top filed from the 4:2:2 format into the 4:2:0 format as described in connection with FIGS. 4A and 4B. According to experiments conducted by the applicants to obtain subjective evaluation of video perception, a tolerable error between an actual filter group delay around ω=0 and an ideal group delay is ±0.05 pixel.

Third Condition: when the group delay of a filter P'(z) normalized by multiplying each coefficient of the upsampling low-pass filter P(z) by a factor of 0.5 to make the sum of all the coefficients equal to 1 is added to the group delay of A(z), the resulting sum is close to (i.e., substantially equal to) an integer number in the vicinity of or at the point where ω=0. In other words, the sum of the modulo-1 remainder of the group delay of the filter P'(z) and the modulo-1 remainder of the group delay of A(z) is substantially equal to 1 in the vicinity of ω=0. This condition can be derived from the requirement that the sum of the group delay of the filter A(z) and the group delay of the filter ½P(z) be substantially equal to zero (or an integer number) in the vicinity of ω=0 in order to provide a near-zero (or integer number) group delay for filtering in the vicinity of ω=0 between before and after upsampling and downsampling according to expression (14). It should be noted that this condition is not satisfied by all perfect reconstruction filters. Taking, as examples, the filters defined by expressions (10a) and (10b) disclosed in Patent Document 1, the group delay of A(z) is 0, and the group delay of P(z) is 0.5, so that the sum of these two is equal to 0.5. This indicates that pixels obtained after downsampling and upsampling are displaced (i.e. shifted) relative to the original image by 0.5 pixel.

Fourth Condition: an interpolation filter Pe(z) having the even-numbered coefficients of the upsampling low-pass filter P(z) has a group delay substantially equal to ⅜ in the vicinity or at the point where ω=0, and an interpolation filter Po(z) having the odd-numbered coefficients of the upsampling low-pass filter P(z) has a group delay substantially equal to ⅞ in the vicinity or at the point where ω=0. This condition corresponds to the characteristics of an ideal display-purpose upsampling filter for converting the top field from the 4:2:0 format into the 4:2:2 format as illustrated in FIG. 4B.

In embodiments that follows, a description will be given of specific examples of a downsampling low-pass filter A(z) for converting a 4:2:2-format chroma signal into a 4:2:0-format chroma signal and an upsampling low-pass filter P(z) for converting the 4:2:0-format chroma signal into a 4:2:2-format chroma signal for the top field that simultaneously satisfy the first through fourth conditions defined above or simultaneously satisfy the first through third conditions. A filter satisfying the above-defined second condition may be modified by swapping higher-order coefficients with lower-order coefficients. That is, a filter satisfying the second condition and having coefficients at(n) (n=0, ..., N−1) may be modified into a filter having coefficients $a_b(n)=a_t(N-1-n)$ (n=0, ..., N−1). Such a modified filter has a group delay equal to 0.75 (or −0.25), so that this filter having coefficients $a_b(n)$ can be applied to the bottom field without any further modification.

The use of such filters achieves the same group delay characteristics as the conventionally preferable characteristics in the conversion from the 4:2:2 format into the 4:2:0 format, so that the mixed use of encoding/decoding apparatuses having conventionally preferable filter characteristics and encoding/decoding apparatuses having filters of the disclosed embodiments does not create undesirable pixel positional displacements. Further, an increase in chroma degradation can be avoided even when the 4:2:2-to-4:2:0 conversion and the 4:2:0-to-4:2:2 conversion are repeated in cascade connections.

According to at least one embodiment, no pixel displacement occurs after 4:2:2-to-4:2:0 conversion and associated 4:2:0-to-4:2:2 conversion, and, also, chroma degradation does not worsen in cascade connections because of the attainment of perfect reconstruction filter bank condition. Further, since the group delay of the 4:2:2-to-4:2:0 conversion is 0.25, compatibility with a conventional downsampling filter having preferable characteristics is attained in terms of phase characteristics.

The applicants of the present application have successfully designed an 8-tap downsampling low-pass filter A(z) for converting a 4:2:2-format chroma signal into a 4:2:0-format chroma signal and an 8-tap upsampling low-pass filter P(z) for converting the 4:2:0-format chroma signal into a 4:2:2-format chroma signal for the top field that simultaneously satisfy the first through third conditions previously defined as well as equation (15) defined in the following, which is a general requirement for low-pass filters that the amplitudes of A(z) and P(z) be both equal to zero at frequency ω=π.

$$A(-1)=P(-1)=0 \quad (15)$$

Coefficients a(k) of the 8-tap downsampling low-pass filter are given as follows (which are rounded to a number having 8 digits after the decimal point).

$a(0)=0.01395999$ $a(1)=-0.07209050$ $a(2)=0.07931346$ $a(3)=0.66382076$ $a(4)=0.40997820$ $a(5)=-0.09209942$ $a(6)=-0.00325165$ $a(7)=0.00036916 \quad (16)$ In this example, the order k of z ranges from 0 to 7. A(z) is represented as follows by use of the coefficients given in coefficient list (16).

$$A(z)=\Sigma a(k)\cdot z^{-k}$$

The group delay of this downsampling low-pass filter A(z) is 3.240488621 at ω=0. The modulo-1 remainder in this case is 0.240488621. This value is sufficiently close to an ideal value of 0.25 for practical purposes, so that the second condition is practically satisfied.

Coefficients p(k) of the 8-tap low-frequency synthesis filter satisfying equation (16) and the perfect reconstruction filter bank condition are given as follows.

$p(0)=-0.00829075$ $p(1)=-0.04281407$ $p(2)=0.03159902$ $p(3)=0.80066600$ $p(4)=0.98606125$ $p(5)=0.24321179$ $p(6)=-0.00936952$ $p(7)=-0.00106372 \quad (17)$ In this example, the order k of z ranges from 0 to 7 as in the case of A(z).

P(z) is represented as follows by use of the coefficients given in coefficient list (17).

$$P(z)=\Sigma p(k)\cdot z^{-k}$$

The group delay of this upsampling low-pass filter P(z) is 0.759511379. When this group delay is added to the group delay of A(z) that is equal to 0.240488621, the resulting sum is equal to 1.00000000. The third condition is thus satisfied. Similarly, the applicants of the present application have successfully designed an 8-tap downsampling low-pass filter A(z) for converting a 4:2:2-format chroma signal into a 4:2:0-format chroma signal and an 8-tap upsampling low-pass filter P(z) for converting the 4:2:0-format chroma signal into a 4:2:2-format chroma signal for the top field that simultaneously satisfy the first through fourth conditions previously defined as well as equation (15) as previously defined, which is a general requirement for low-pass filters that the amplitudes of A(z) and P(z) be both equal to zero at frequency ω=n.

The 8-tap low-frequency analysis filter A(z) is represented as $A(z)=\Sigma a(k)\cdot z^{-k}$ by use of z transform. These coefficients a(k) for which k is limited to a range of 0 to 7 are given in the following (which are rounded to a number having 8 digits after the decimal point).

$a(0)=-0.001239235$ $a(1)=-0.049817167$ $a(2)=0.146739102$ $a(3)=0.56466012$ $a(4)=0.378624569$ $a(5)=-0.010218885$ $a(6)=-0.024124436$ $a(7)=-0.004624068 \quad (18)$ In this example, the order k of z ranges from 0 to 7 for the sake of convenience.

The group delay of this low-frequency analysis filter A(z) is 0.223930156 at ω=0. This value is sufficiently close to an ideal value of 0.25 for practical purposes.

The 8-tap low-frequency synthesis filter P(z) is represented as $P(z)=\Sigma p(k)\cdot z^{-k}$ by use of z transform. These coefficients p(k) for which k is limited to a range of 0 to 7 are given in the following.

$p(0)=0.000411982$ $p(1)=-0.016561661$ $p(2)=-0.061368346$ $p(3)=0.693640685$ $p(4)=1.214307158$ $p(5)=0.293527356$ $p(6)=-0.153350794$ $p(7)=0.029393620$ (19)

The group delay of this upsampling low-pass filter P(z) is 0.776069844. When this group delay is added to the group delay of A(z) that is equal to 0.223930156, the resulting sum is equal to 1.00000000. The third condition is thus satisfied.

Based on the above-described filter, coefficients pe(k) of the filter Pe(z) and coefficients po(k) of the filter Po(z) are given as follows.

$pe(0)=-0.016561661$ $pe(1)=0.693640685$ $pe(2)=0.293527356$ $pe(3)=0.029393620$ (20)

$po(0)=0.000411982$ $po(1)=-0.061368346$ $po(2)=1.214307158$ $po(3)=-0.153350794$ (21)

The group delay of this interpolation low-frequency analysis filter Pe(z) having even-number-z-order coefficients of P(z) is 0.368876257 at $\omega=0$. This value is sufficiently close to an ideal value of $3/8=0.375$. The group delay of this interpolation low-frequency analysis filter Po(z) having odd-number-z-order coefficients of P(z) is 0.907193587 at $\omega=0$. This value is sufficiently close to an ideal value of $7/8=0.875$. The fourth condition is thus satisfied. The use of these filters makes it possible to freely combine encoding apparatuses and decoding apparatuses according to embodiments disclosed herein with conventional encoding apparatuses and decoding apparatuses without changing filters. In the following, embodiments will be described.

First Embodiment

Figure 8:
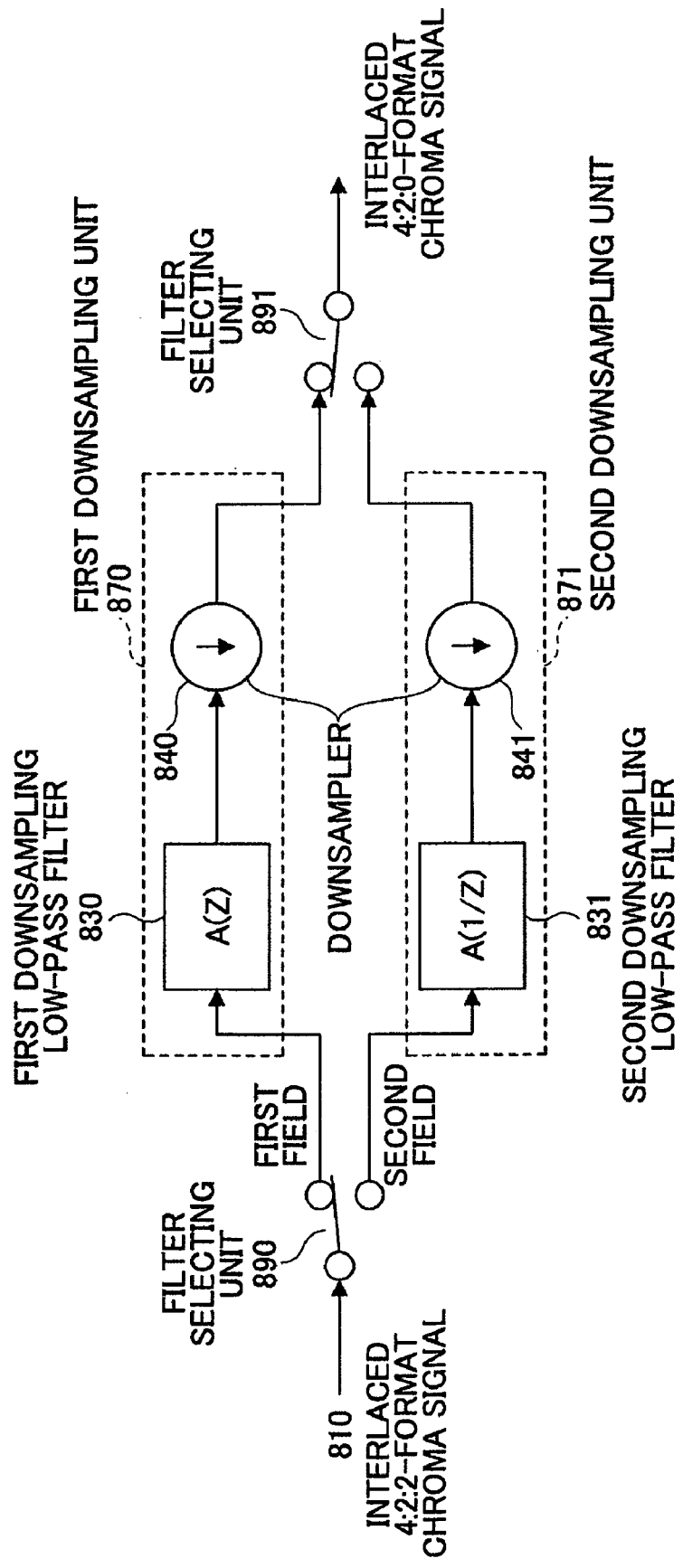
FIG. 8 is a drawing illustrating a 4:2:2-to-4:2:0 conversion apparatus according to a first embodiment.

A description will be given of a first embodiment by referring to FIG. 8. The first embodiment is directed to a signal processing apparatus for converting interlaced 4:2:2-format video signals including a luminance component and two chroma components into interlaced 4:2:0 format video signals.

A first downsampling unit 870 includes a first downsampling low-pass filter 830 for applying vertical-direction filtering to pixels in a first chroma field selected by a filter selecting unit 890 from interlaced 4:2:2-format video signals 810 and a downsampler 840 for downsampling by a ratio of 2:1 to produce a first chroma field of the interlaced 4:2:0-format video signals.

A second downsampling unit 871 includes a second downsampling low-pass filter 831 obtained by reversing an order of coefficients of the first downsampling low-pass filter for applying vertical-direction filtering to pixels in a second chroma field selected by the filter selecting unit 890 from the interlaced 4:2:2-format video signals 810 and a downsampler 841 for downsampling by a ratio of 2:1 to produce a second chroma field of the interlaced 4:2:0-format video signals.

The first downsampling low-pass filter has such a group delay that a modulo-1 remainder of the group delay at frequency $\omega=0$ is substantially equal to 0.25.

The first downsampling low-pass filter is configured to allow at least one upsampling low-pass filter to exist such that the first downsampling low-pass filter and the upsampling low-pass filter satisfy perfect reconstruction filter bank condition within a predetermined error tolerance range.

The sum of the group delay of the first downsampling low-pass filter and the group delay of a normalized filter obtained by making the sum of all the coefficients of the upsampling low-pass filter equal to 1 is substantially equal to an integer number at frequency $\omega=0$ within a predetermined error tolerance range. In this manner, the present embodiment employs a downsampling filter that satisfies the first through third conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics. In FIG. 8, the second downsampling low-pass filter 831 is illustrated as having characteristic A(1/Z). This is equivalent to a process that switches the coefficients of the filter A(Z) between the higher-order side and the lower-order side, except for z to the power of a number. FIG. 8 illustrates the filter selecting units 890 and 891 that select an input into and output from the first downsampling unit and the second downsampling unit. The filter selecting units 890 and 891 may perform this selection by use of field parity. It should be noted that this configuration is not limiting. Various configurations of the first and second downsampling units are possible as to their arrangement and how to process the first and second fields, and any one of these configurations may properly be used. The present embodiment is directed to an example in which downsampling is performed after corresponding filtering. This is not a limiting example. Another configuration such as one in which filtering is selectively applied only to pixels to be output may alternatively be employed.

Second Embodiment

Figure 9:
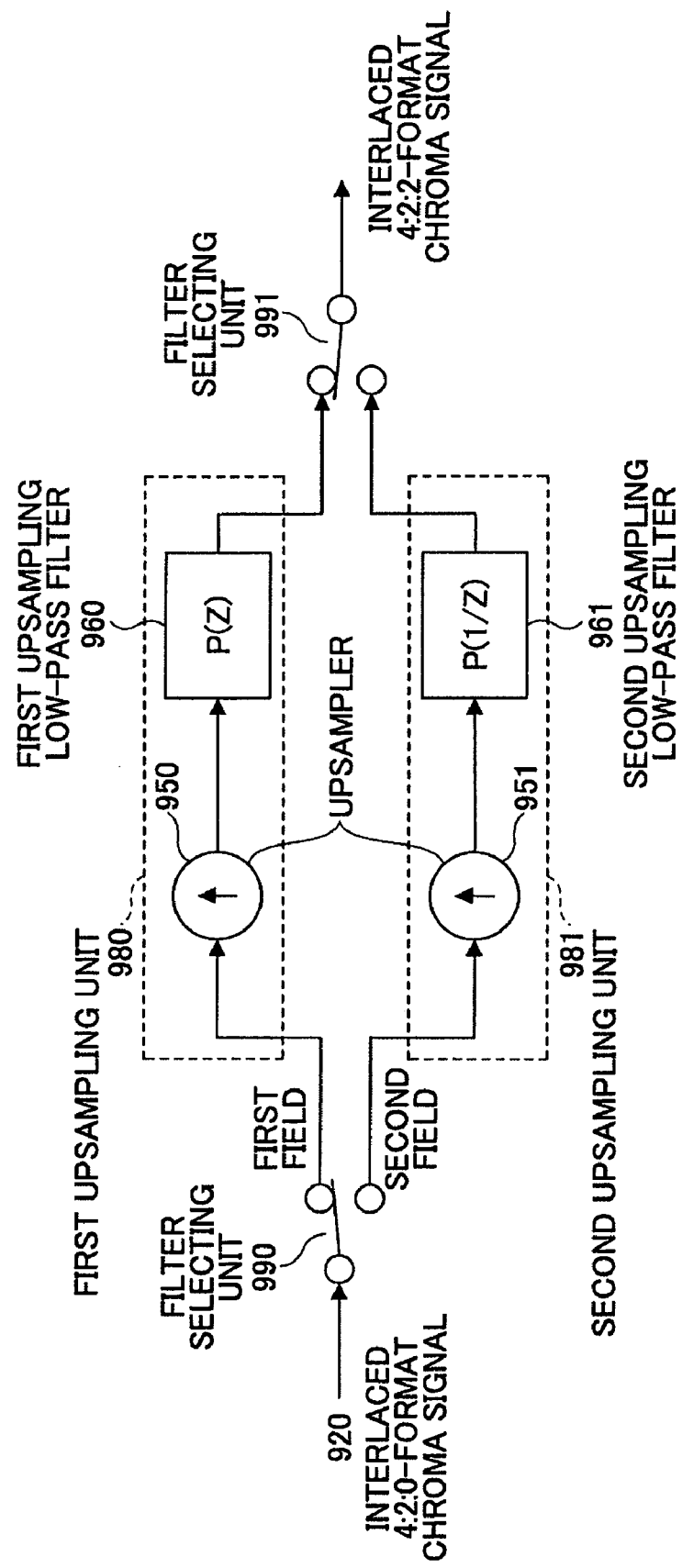
FIG. 9 is a drawing illustrating a 4:2:0-to-4:2:2 conversion apparatus according to a second embodiment.

A description will be given of a second embodiment by referring to FIG. 9. The second embodiment is directed to a signal processing apparatus for converting interlaced 4:2:0-format video signals including a luminance component and two chroma components into interlaced 4:2:2 format video signals.

A first upsampling unit 980 includes an upsampler 950 to produce upsampled pixels twice as many as original pixels in a first chroma field selected by a filter selecting unit 990 from interlaced 4:2:0-format video signals 920 and a first upsampling low-pass filter 960 for applying vertical-direction filtering to the upsampled pixels to produce a first chroma field of the interlaced 4:2:2-format video signals.

A second upsampling unit 981 includes an upsampler 951 to produce upsampled pixels twice as many as original pixels in a second chroma field selected by the filter selecting unit 990 from the interlaced 4:2:0-format video signals 920 and a second upsampling low-pass filter 961 obtained by reversing an order of coefficients of the first upsampling low-pass filter for applying vertical-direction filtering to the upsampled pixels to produce a second chroma field of the interlaced 4:2:2-format video signals.

The first upsampling low-pass filter is configured to allow at least one downsampling low-pass filter to exist such that the first upsampling low-pass filter and the downsampling low-pass filter satisfy perfect reconstruction filter bank condition within a predetermined error tolerance range.

The downsampling low-pass filter has such a group delay that a modulo-1 remainder of the group delay at frequency $\omega=0$ is substantially equal to 0.25.

The sum of the group delay of the downsampling low-pass filter and the group delay of a normalized filter obtained by making the sum of all the coefficients of the first upsampling low-pass filter equal to 1 is substantially equal to an integer number at frequency $\omega=0$ within a predetermined error tolerance range. In this manner, the present embodiment employs an upsampling filter that satisfies the first through third conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics. FIG. 9 illustrates the filter selecting units 990 and 991 that select an input into and output from the first upsampling unit and the second upsampling unit. The filter selecting units 990 and 991 may perform this selection by use of field parity. This is only a non-limiting example. Various configurations of the first and second upsampling units are possible as to their arrangement and how to process the first and second fields, and any one of these configurations may properly be used. Further, a description has been given of an example in which upsampling is performed by inserting zero after each pixel in a reduced image, followed by applying upsampling low-pass filtering. This is not a limiting example. For example, filters as defined by Pe(z) and Po(z) of formulas (5a) and (5b) may be applied in an alternating manner in the vertical direction to produce an enlarged image.

Third Embodiment

Figure 10:
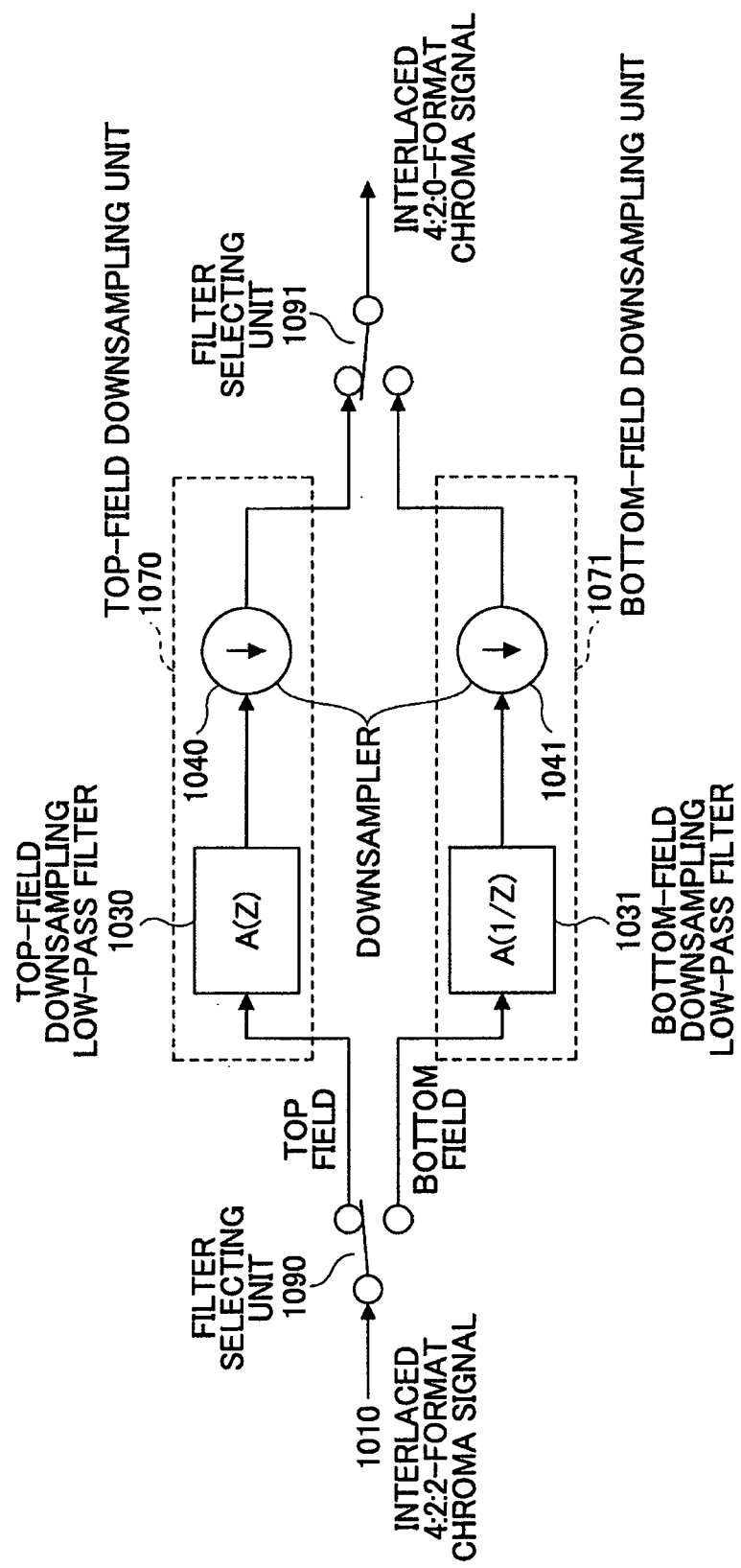
FIG. 10 is a drawing illustrating a 4:2:2-to-4:2:0 conversion apparatus according to a third embodiment.

A description will be given of a third embodiment by referring to FIG. 10. The third embodiment is directed to a signal processing apparatus for converting interlaced 4:2:2-format video signals including a luminance component and two chroma components into interlaced 4:2:0 format video signals. A top-field downsampling unit 1070 includes an 8-tap top-field downsampling low-pass filter 1030 for applying vertical-direction filtering to pixels in a chroma top field selected by a filter selecting unit 1090 from interlaced 4:2:2-format video signals 1010 and a downsampler 1040 for downsampling by a ratio of 2:1 to produce a chroma top field of the interlaced 4:2:0-format video signals.

The 8 coefficients of the 8-tap top-field downsampling low-pass filter 1030 are given as follows, which are the same as those of coefficient list (16).

$a(0)=0.01395999$ $a(1)=-0.07209050$ $a(2)=0.07931346$ $a(3)=0.66382076$ $a(4)=0.40997820$ $a(5)=-0.09209942$ $a(6)=-0.00325165$ $a(7)=0.00036916$

A bottom-field downsampling unit 1071 includes an 8-tap bottom-field downsampling low-pass filter 1031 for applying vertical-direction filtering to pixels in a chroma bottom field selected by the filter selecting unit 1090 from the interlaced 4:2:2-format video signals 1010 and a downsampler 1041 for downsampling by a ratio of 2:1 to produce a chroma bottom field of the interlaced 4:2:0-format video signals.

The coefficients of the downsampling low-pass filter 1031 are obtained by switching the coefficients of the top-field downsampling low-pass filter between the higher-order side and the lower-order side, i.e., by reversing an order of the coefficients, and are defined as follows.

$a(0)=0.00036916$ $a(1)=-0.00325165$ $a(2)=-0.09209942$ $a(3)=0.40997820$ $a(4)=0.66382076$ $a(5)=0.07931346$ $a(6)=-0.07209050$ $a(7)=0.01395999$

The top-field downsampling low-pass filter having the coefficients given in list (16) has such a group delay that a modulo-1 remainder of the group delay at frequency $\omega=0$ is 0.240488621, which is 1 substantially equal to 0.25.

The top-field downsampling low-pass filter is configured to allow at least one upsampling low-pass filter having the coefficients given in list (17) to exist such that the top-field downsampling low-pass filter and the upsampling low-pass filter satisfy perfect reconstruction filter bank condition within a predetermined error tolerance range.

The group delay of a filter obtained by normalizing the upsampling low-pass filter is 0.759511379 at frequency $\omega=0$, and the group delay of the downsampling low-pass filter is 0.240488621 at frequency $\omega=0$, so that the sum of these group delays is 1.00000000, which is substantially equal to an integer number. In this manner, the present embodiment employs a downsampling filter that satisfies the first through third conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics. The present embodiment is directed to an example in which downsampling is performed after corresponding filtering. This is not a limiting example. Another configuration such as one in which filtering is selectively applied only to pixels to be output may alternatively be employed.

Fourth Embodiment

Figure 11:
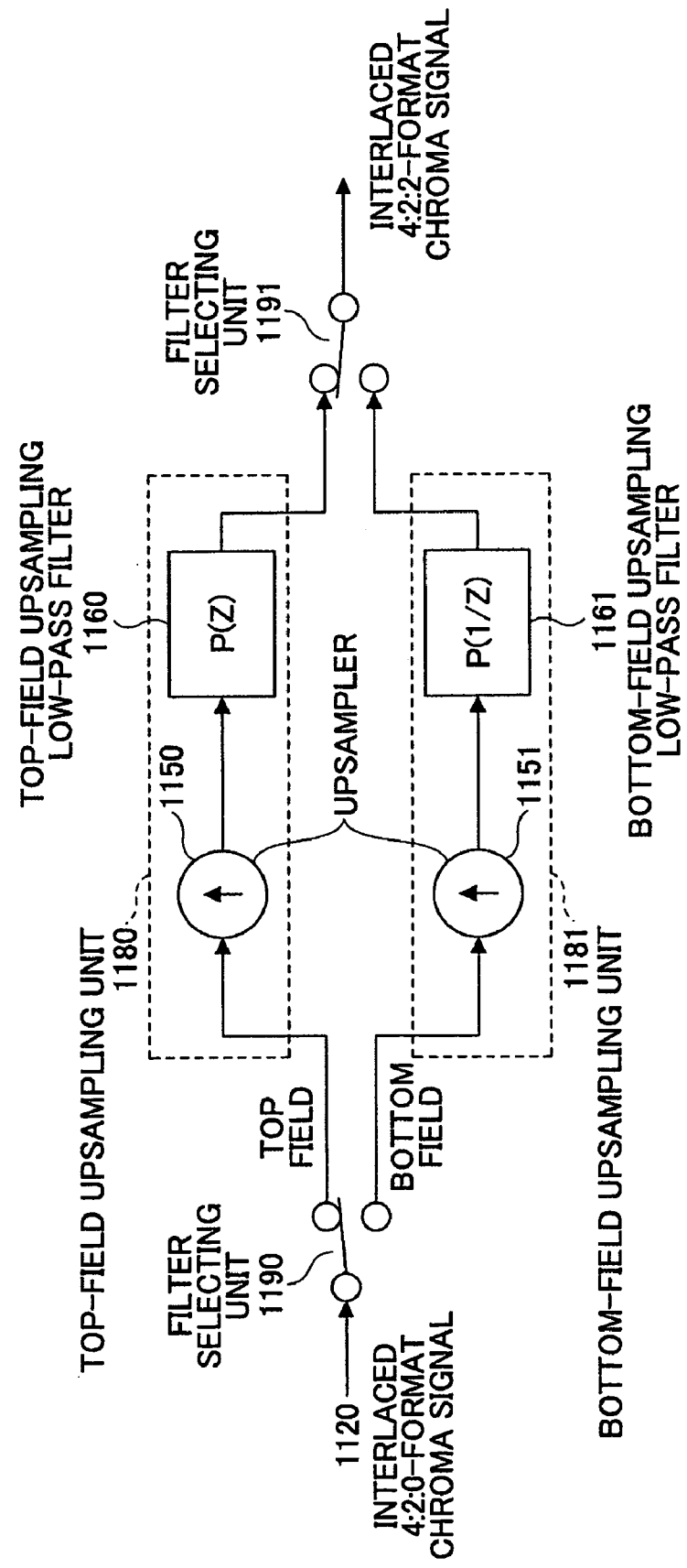
FIG. 11 is a drawing illustrating a 4:2:0-to-4:2:2 conversion apparatus according to a fourth embodiment.

A description will be given of a fourth embodiment by referring to FIG. 11. The fourth embodiment is directed to a signal processing apparatus for converting interlaced 4:2:0-format video signals including a luminance component and two chroma components into interlaced 4:2:2 format video signals. A top-field upsampling unit 1180 includes an upsampler 1150 to produce upsampled pixels twice as many as original pixels in a chroma top field selected by a filter selecting unit 1190 from interlaced 4:2:0-format video signals 1120 and a top-field upsampling low-pass filter 1160 for applying vertical-direction filtering to the upsampled pixels to produce a chroma top field of the interlaced 4:2:2-format video signals.

The 8 tap coefficients of the top-field upsampling low-pass filter 1160 are given as follows, which are the same as those of coefficient list (17).

$p(0)=-0.00829075$ $p(1)=-0.04281407$ $p(2)=0.03159902$ $p(3)=0.80066600$ $p(4)=0.98606125$ $p(5)=0.24321179$ $p(6)=-0.00936952$ $p(7)=-0.00106372$

A bottom-field upsampling unit 1181 includes an upsampler 1151 to produce upsampled pixels twice as many as original pixels in a chroma bottom field selected by the filter selecting unit 1100 from the interlaced 4:2:0-format video signals 1120 and a bottom-field upsampling low-pass filter 1161 for applying vertical-direction filtering to the upsampled pixels to produce a chroma bottom field of the interlaced 4:2:2-format video signals.

The coefficients of the bottom-field upsampling low-pass filter 1161 are obtained by switching the coefficients of the top-field upsampling low-pass filter between the higher-order side and the lower-order side, i.e., by reversing an order of the coefficients, and are defined as follows.

$p'(0)=-0.00106372$ $p'(1)=-0.00936952$ $p'(2)=0.24321179$ $p'(3)=0.98606125$ $p'(4)=0.80066600$ $p'(5)=0.03159902$ $p'(6)=-0.04281407$ $p'(7)=-0.00829075$

The top-field upsampling low-pass filter having the coefficients given in list (17) is configured to allow at least one downsampling low-pass filter having the coefficients given in list (16) to exist such that the top-field upsampling low-pass filter and the downsampling low-pass filter satisfy perfect reconstruction filter bank condition within a predetermined error tolerance range.

The downsampling low-pass filter has such a group delay that a modulo-1 remainder of the group delay at frequency $\omega=0$ is 0.240488621, which is substantially equal to 0.25.

The group delay of the downsampling low-pass filter is 0.240488621 at frequency $\omega=0$, and the group delay of a normalized filter obtained by making the sum of all the coefficients of the top-field upsampling low-pass filter equal to 1 is 0.759511379 at frequency $\omega=0$, so that the sum of these two group delays is 1.00000000, which is substantially equal to an integer number. In this manner, the present embodiment employs an upsampling filter that satisfies the first through third conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics.

Fifth Embodiment

Figure 12:
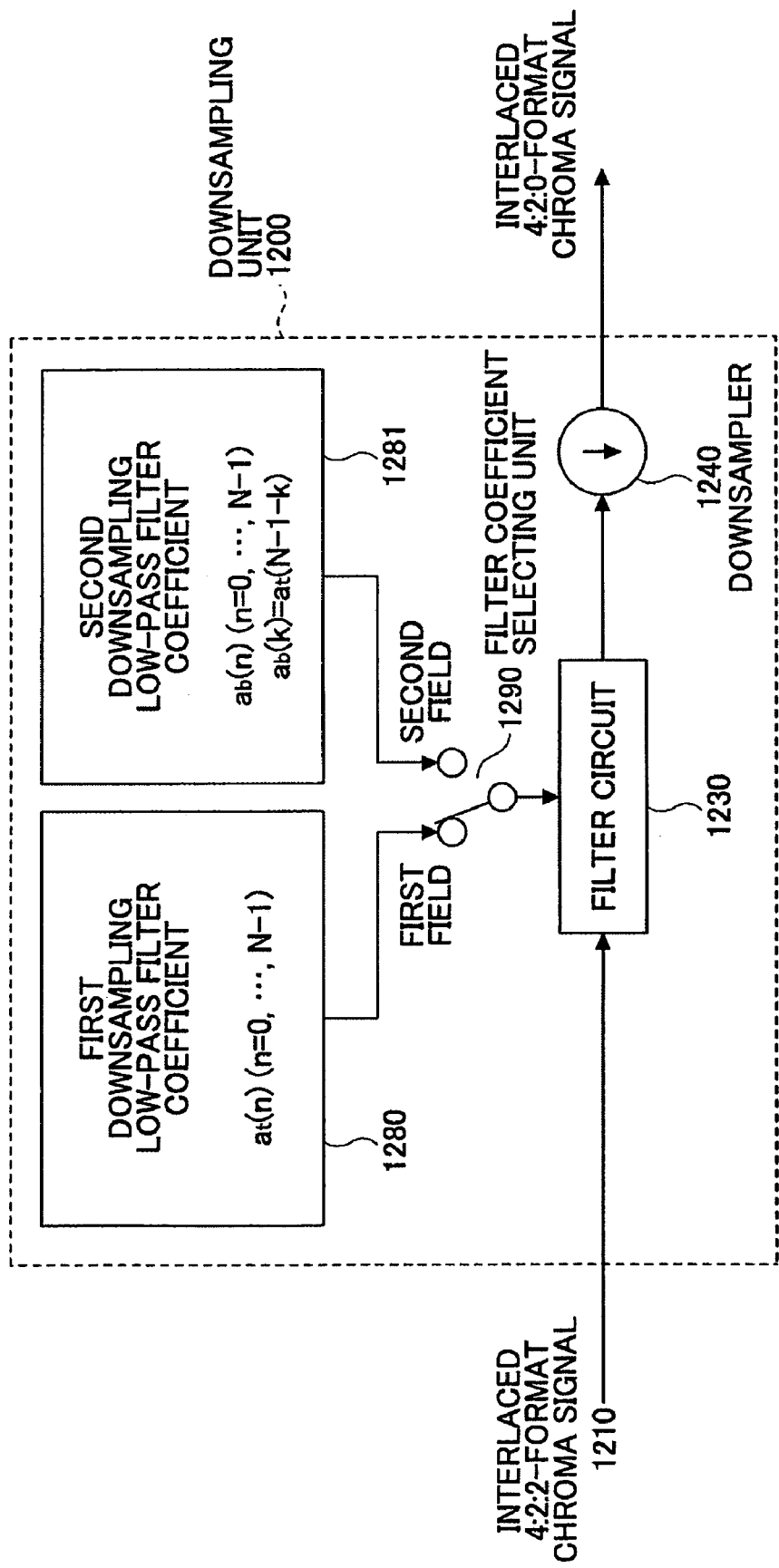
FIG. 12 is a drawing illustrating a 4:2:2-to-4:2:0 conversion apparatus according to a fifth embodiment.

A description will be given of a fifth embodiment by referring to FIG. 12. The fifth embodiment is directed to a signal processing apparatus for converting interlaced 4:2:2-format video signals including a luminance component and two chroma components into interlaced 4:2:0 format video signals. This signal processing apparatus includes a downsampling unit 1200 that performs the following process. A filter circuit 1230 receives coefficients 1280 for a first downsampling low-pass filter selected by a filter coefficient selecting unit 1290, and applies filtering to pixels in a first chroma field of interlaced 4:2:2-format video signals 1210.

A downsampler 1240 downsamples by a ratio of 2:1 to generate a first chroma field of interlaced 4:2:0-format video signals.

The filter circuit 1230 receives coefficients 1281 for a second downsampling low-pass filter selected by the filter coefficient selecting unit 1290, the coefficients 1281 being obtained by reversing an order of the coefficients of the first downsampling low-pass filter, and applies filtering to pixels in a second chroma field of the interlaced 4:2:2-format video signals 1210.

The downsampler 1240 downsamples by a ratio of 2:1 to generate a second chroma field of the interlaced 4:2:0-format video signals.

The first downsampling low-pass filter has such a group delay that a modulo-1 remainder of the group delay at frequency $\omega=0$ is substantially equal to 0.25.

The first downsampling low-pass filter is configured to allow at least one upsampling low-pass filter to exist such that the first downsampling low-pass filter and the upsampling low-pass filter satisfy perfect reconstruction filter bank condition within a predetermined error tolerance range.

The sum of the group delay of the first downsampling low-pass filter and the group delay of a normalized filter obtained by making the sum of all coefficients of the upsampling low-pass filter equal to 1 is substantially equal to an integer number at frequency $\omega=0$ within a predetermined error tolerance range. In this manner, the present embodiment employs a downsampling filter that satisfies the first through third conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics.

Sixth Embodiment

Figure 13:
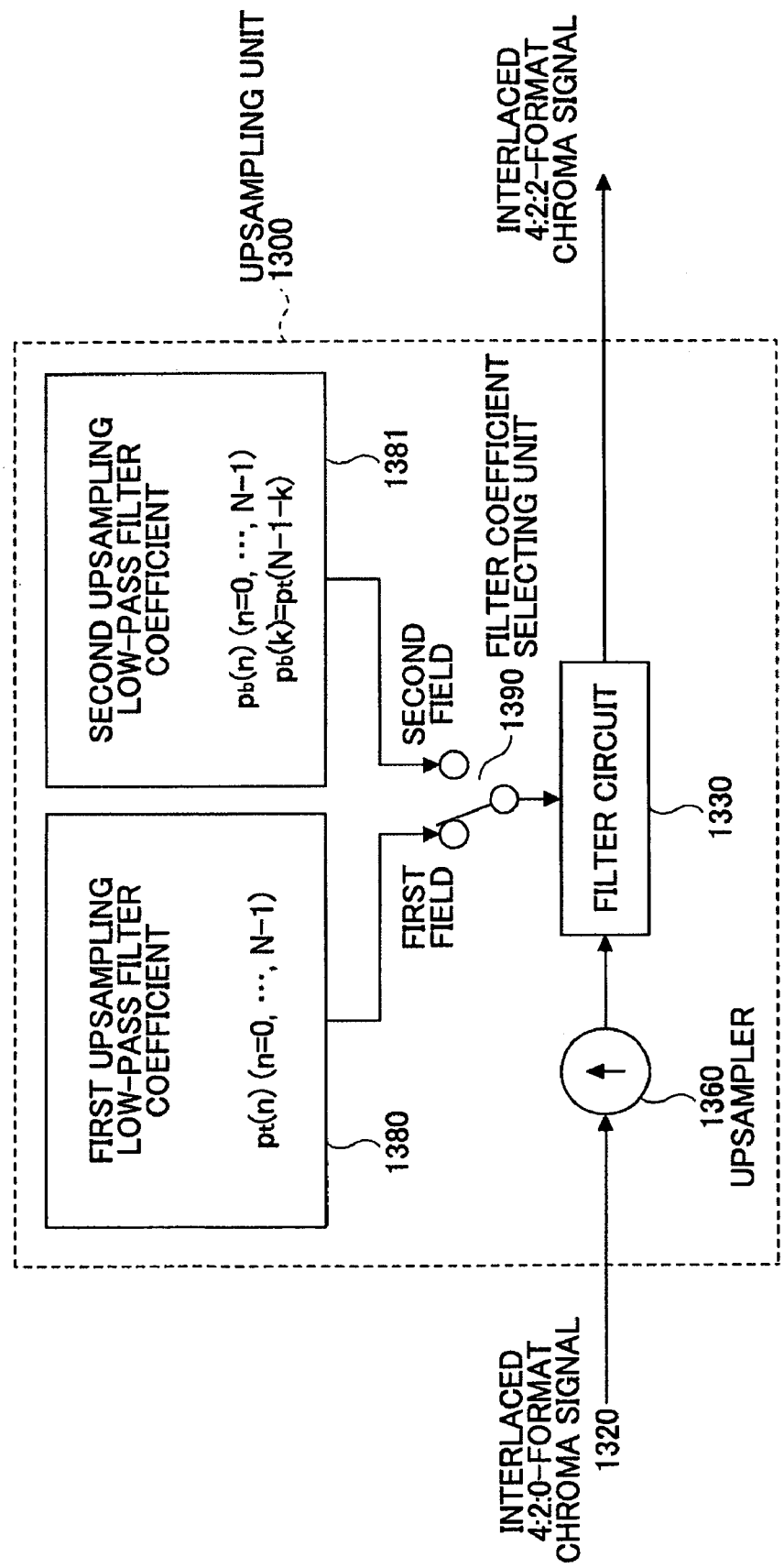
FIG. 13 is a drawing illustrating a 4:2:0-to-4:2:2 conversion apparatus according to a sixth embodiment.

A description will be given of a sixth embodiment by referring to FIG. 13. The sixth embodiment is directed to a signal processing apparatus for converting interlaced 4:2:0-format video signals including a luminance component and two chroma components into interlaced 4:2:2 format video signals. This signal processing apparatus includes an upsampling unit 1300 that performs the following process. An upsampler 1360 inserts zeros between pixels in a first chroma field of interlaced 4:2:0-format video signals 1320 to double the number of pixels.

A filter circuit 1330 receives coefficients 1380 for a first upsampling low-pass filter selected by a filter coefficient selecting unit 1390, and performs filtering to produce a first chroma field of interlaced 4:2:2-format video signals.

The upsampler 1360 inserts zeros between pixels in a second chroma field of the interlaced 4:2:0-format video signals 1320 to double the number of pixels.

The filter circuit 1330 receives coefficients 1381 for a second upsampling low-pass filter selected by the filter coefficient selecting unit 1390, the coefficients 1381 being obtained by reversing an order of the coefficients of the first upsampling low-pass filter, and performs filtering to produce a second chroma field of the interlaced 4:2:2-format video signals.

The first upsampling low-pass filter is configured to allow at least one downsampling low-pass filter to exist such that the first upsampling low-pass filter and the downsampling low-pass filter satisfy perfect reconstruction filter bank condition within a predetermined error tolerance range.

The downsampling low-pass filter has such a group delay that a modulo-1 remainder of the group delay at frequency $\omega=0$ is substantially equal to 0.25.

Figure 14:
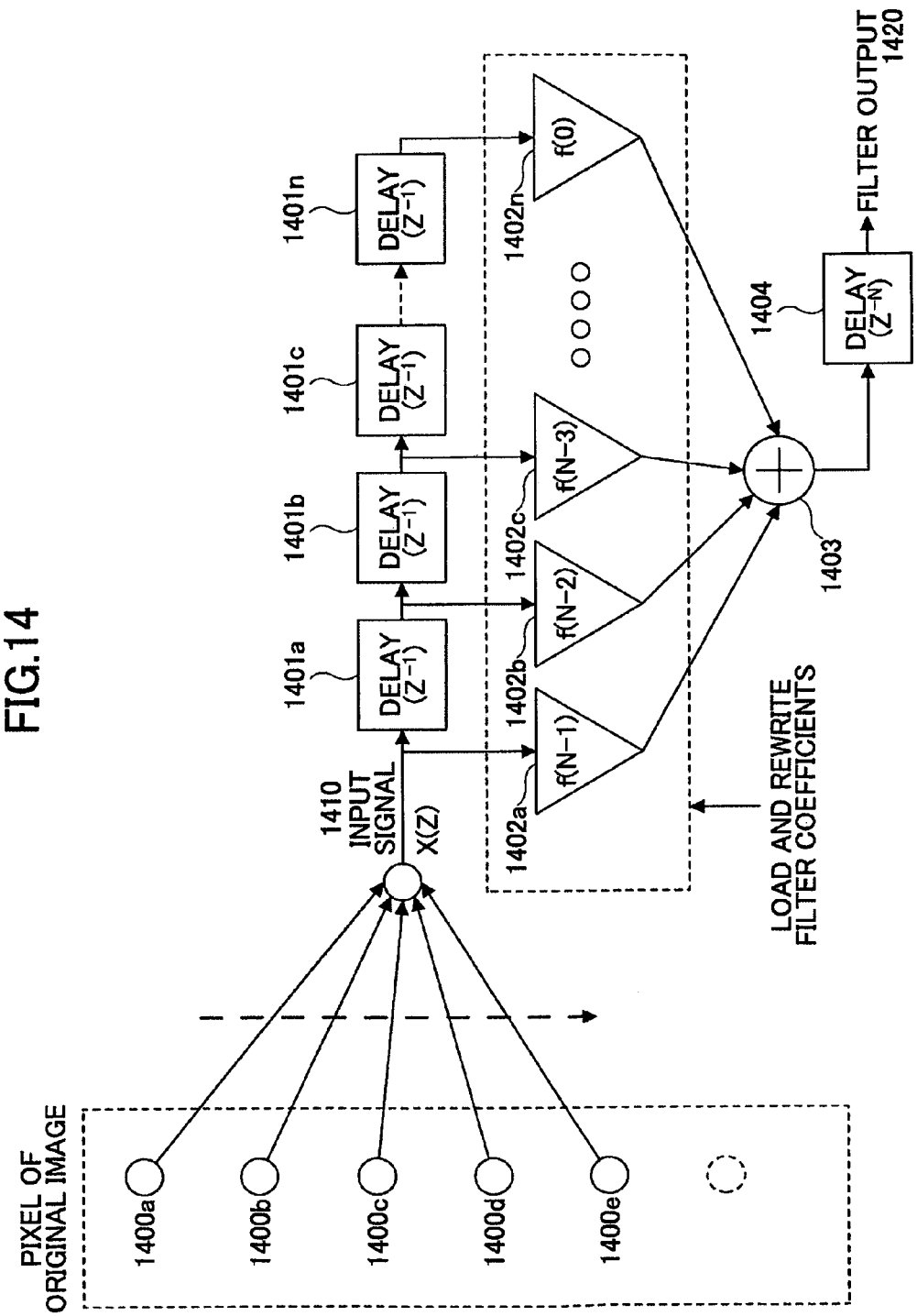
FIG. 14 is a drawing illustrating an example of the configuration of a filter circuit.

The sum of the group delay of the downsampling low-pass filter and the group delay of a normalized filter obtained by making the sum of all coefficients of the first upsampling low-pass filter equal to 1 is substantially equal to an integer number at frequency $\omega=0$ within a predetermined error tolerance range. In this manner, the present embodiment employs an upsampling filter that satisfies the first through third conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics. FIG. 14 is a drawing illustrating an example of the configuration of the filter circuit illustrated in FIG. 12 or FIG. 13. The configuration illustrated in FIG. 14 is intended to apply filtering to an image in a vertical direction by use of N tap coefficients f(0) through f(N−1). As illustrated in FIG. 14, pixels 1400a through 1400e are successively selected from top to bottom in the figure to be subjected to filtering, so that the selected pixels are successively supplied, with the pixel 1400a being first, to a computing circuit as an input signal 1410. The input signal 1410 is successively delayed by a unit delay through each delay unit 1401a through 1401n. The outputs of the delay units 1401a through 1401n are coupled to multipliers 1402a through 1402n, respectively. The multipliers 1402a through 1402n multiply their inputs by the coefficients f(0) through f(N−1), respectively, as given in expression (8) An adder 1403 adds up all the resulting products. A delay unit 1404 delays the output of the adder 1403 by a predetermined delay length according to need, and outputs a filter output value 1420. The delay unit 1404 is provided to adjust the timing at which pixels are output. The presence or absence of such a delay, or rather the presence or absence of such a circuit, may be determined by taking into account the need of this delay.

Seventh Embodiment

Figure 15:
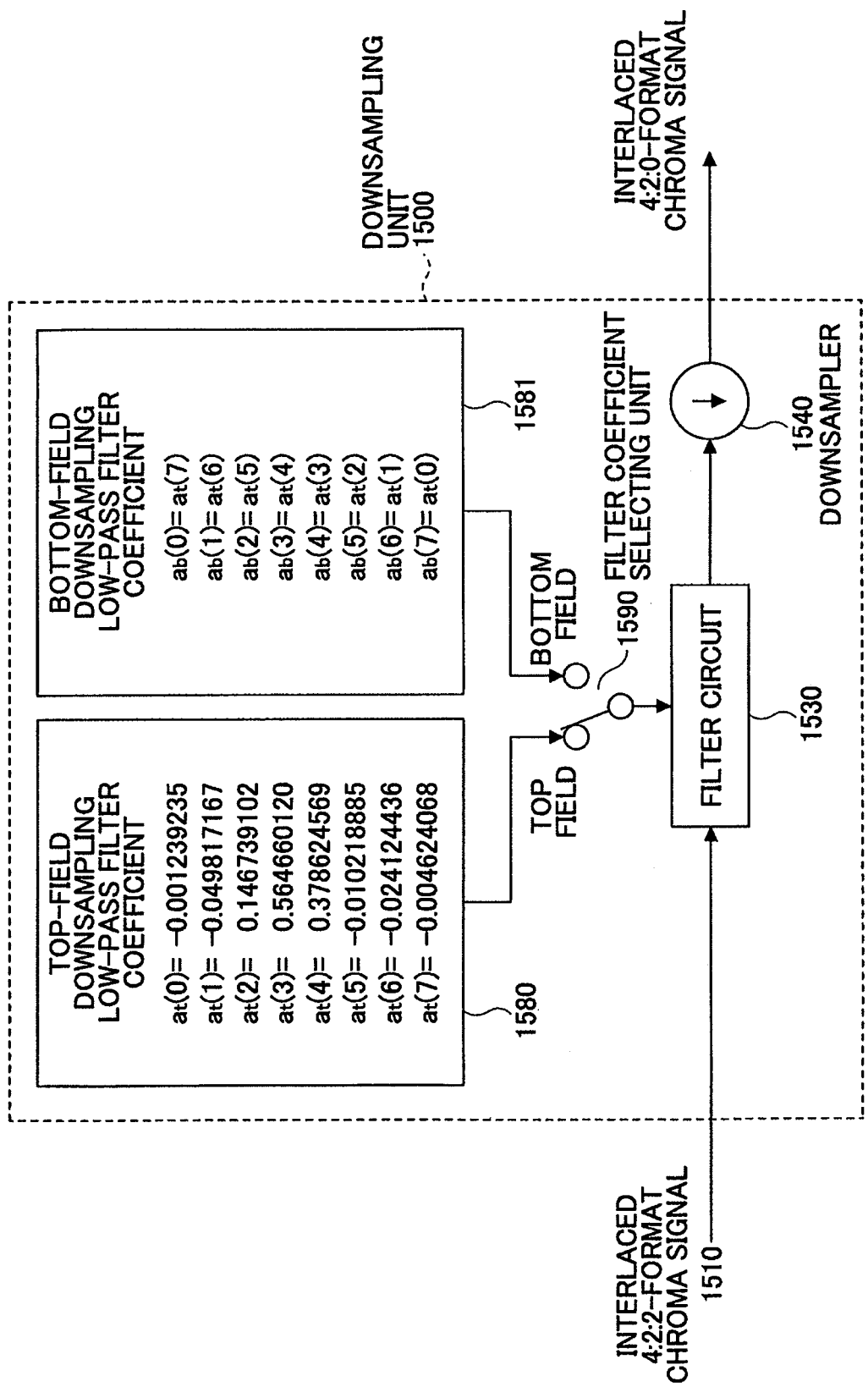
FIG. 15 is a drawing illustrating a 4:2:2-to-4:2:0 conversion apparatus according to a seventh embodiment.

A description will be given of a seventh embodiment by referring to FIG. 15. The seventh embodiment is directed to a signal processing method for converting interlaced 4:2:2-format video signals including a luminance component and two chroma components into interlaced 4:2:0 format video signals. A downsampling unit 1500 performs the following process. A filter circuit 1530 receives coefficients 1580 for a top-field downsampling low-pass filter selected by a filter coefficient selecting unit 1590, and applies filtering to pixels in a chroma top field of interlaced 4:2:2-format video signals 1510.

The coefficients 1580 of the top-field downsampling low-pass filter are 8-tap coefficients given as follows, which are the same as those of coefficient list (18).

$at(0)=-0.001239235$ $at(1)=-0.049817167$ $at(2)=0.146739102$ $at(3)=0.56466012$ $at(4)=0.378624569$ $at(5)=-0.010218885$ $at(6)=-0.024124436$ $at(7)=-0.004624068$

A downsampler 1540 downsamples by a ratio of 2:1 to generate a chroma top field of interlaced 4:2:0-format video signals.

The filter circuit 1530 receives coefficients 1581 for a bottom-field downsampling low-pass filter selected by the filter coefficient selecting unit 1590, and applies filtering to pixels in a chroma bottom field of the interlaced 4:2:2-format video signals 1510.

The coefficients 1581 of the bottom-field downsampling low-pass filter are obtained by switching the coefficients of the top-field downsampling low-pass filter between the higher-order side and the lower-order side, i.e., by reversing an order of the coefficients, and are defined as follows.

$ab(0)=-0.001239235$ $ab(1)=-0.049817167$ $ab(2)=0.146739102$ $ab(3)=0.56466012$ $ab(4)=0.378624569$ $ab(5)=-0.010218885$ $ab(6)=-0.024124436$ $ab(7)=-0.004624068$

The downsampler 1540 downsamples by a ratio of 2:1 to generate a chroma bottom field of the interlaced 4:2:0-format video signals.

The top-field downsampling low-pass filter having the coefficients given in list (18) has such a group delay that a modulo-1 remainder of the group delay at frequency ω=0 is 0.223930156, which is 1 substantially equal to 0.25 for practical purposes.

The top-field downsampling low-pass filter is configured to allow at least one upsampling low-pass filter having the coefficients given in list (19) to exist such that the top-field downsampling low-pass filter and the upsampling low-pass filter satisfy perfect reconstruction filter bank condition within a predetermined error tolerance range.

The group delay of a filter obtained by normalizing the upsampling low-pass filter is 0.776069844 at frequency ω=0, and the group delay of the top-field downsampling low-pass filter is 0.223930156 at frequency ω=0, so that the sum of these group delays is 1.00000000, which is substantially equal to an integer number. The upsampling low-pass filter having the filter coefficients given in list (19) also satisfies the fourth condition as previously described. In this manner, the present embodiment employs a downsampling filter that satisfies the first through fourth conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics.

Eighth Embodiment

Figure 16:
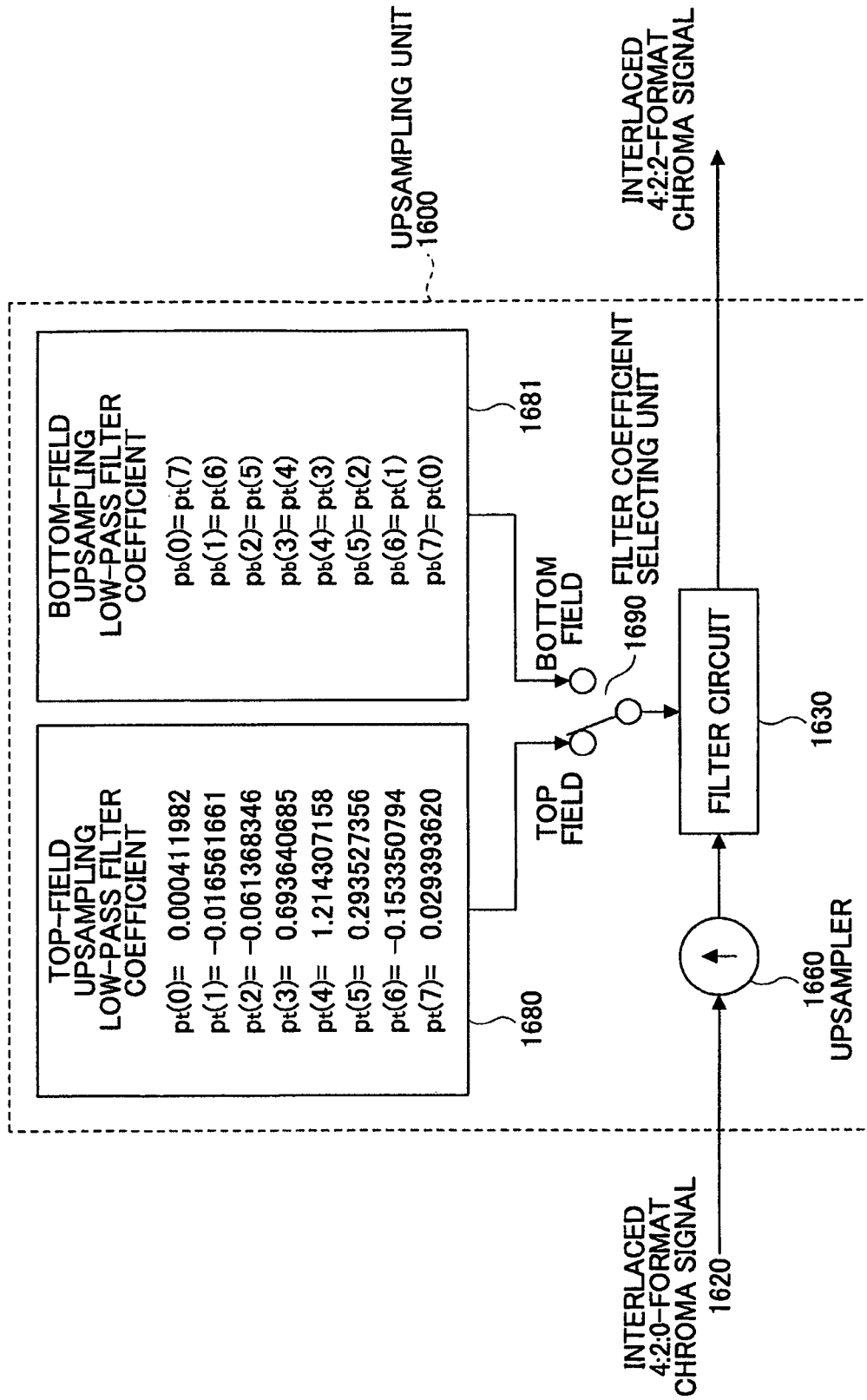
FIG. 16 is a drawing illustrating a 4:2:0-to-4:2:2 conversion apparatus according to an eighth embodiment.

A description will be given of an eighth embodiment by referring to FIG. 16. The eighth embodiment is directed to a signal processing method for converting interlaced 4:2:0-format video signals including a luminance component and two chroma components into interlaced 4:2:2 format video signals. A upsampling unit 1600 performs the following process.

An upsampler 1660 inserts zeros between pixels in a chroma top field of interlaced 4:2:0-format video signals 1620 to double the number of pixels.

A filter circuit 1630 receives coefficients 1680 for a top-field upsampling low-pass filter selected by a filter coefficient selecting unit 1690, and performs filtering to produce a chroma top field of interlaced 4:2:2-format video signals.

The coefficients 1680 of the top-field upsampling low-pass filter are coefficients given as follows, which are the same as those of coefficient list (19).

$pt(0)=0.000411982$ $pt(1)=-0.016561661$ $pt(2)=-0.061368346$ $pt(3)=0.693640685$ $pt(4)=1.214307158$ $pt(5)=0.293527356$ $pt(6)=-0.153350794$ $pt(7)=0.029393620$

The upsampler 1660 inserts zeros between pixels in a chroma bottom field of the interlaced 4:2:0-format video signals 1620 to double the number of pixels.

The filter circuit 1630 receives coefficients 1681 for a bottom-field upsampling low-pass filter selected by the filter coefficient selecting unit 1690, and performs filtering to produce a chroma bottom field of the interlaced 4:2:2-format video signals.

The coefficients 1681 of the bottom-field upsampling low-pass filter are obtained by switching the coefficients of the top-field upsampling low-pass filter between the higher-order side and the lower-order side, i.e., by reversing an order of the coefficients, and are defined as follows.

$pb(0)=0.029393620$ $pb(1)=-0.153350794$ $pb(2)=0.293527356$ $pb(3)=1.214307158$ $pb(4)=0.693640685$ $pb(5)=-0.061368346$ $pb(6)=-0.016561661$ $pb(7)=0.000411982$

In this manner, the present embodiment employs a downsampling filter that satisfies the first through fourth conditions previously defined, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics.

Ninth Embodiment

Figure 17:
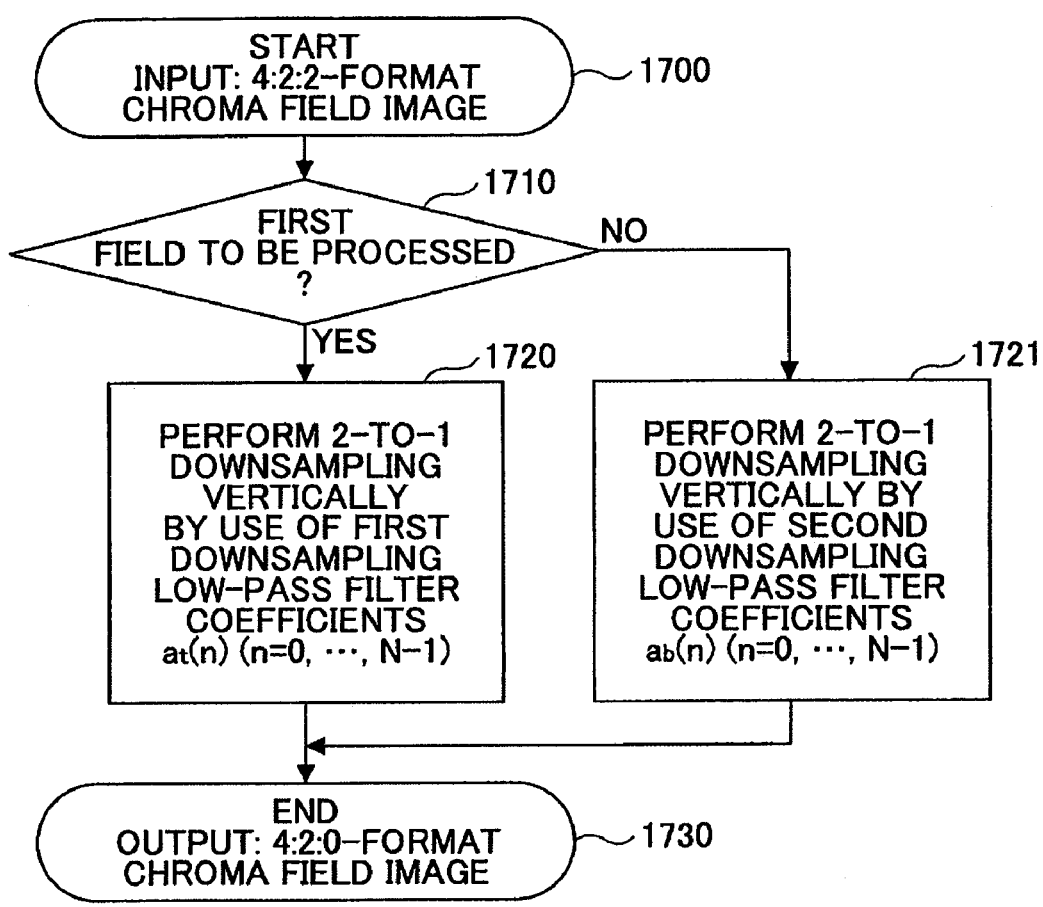
FIG. 17 is a drawing illustrating a 4:2:2-to-4:2:0 conversion method according to a ninth embodiment.

FIG. 17 is a drawing for explaining a ninth embodiment that is directed to a method for 4:2:2-to-4:2:0 conversion. In step 1700, a 4:2:2 chroma field image is input. In step 1710, a check is made as to whether the field of interest is a first field. If the answer is yes, downsampling is performed in step 1720 by use of coefficients at(n) (n=0, . . . , N−1) satisfying the following conditions for use in a first downsampling low-pass filter.

First Condition: the filter having these coefficients has such a group delay that a modulo-1 remainder of the group delay at frequency ω=0 is substantially equal to 0.25.

Second Condition: there is at least one upsampling low-pass filter, such that the filter having the above-noted coefficients and the upsampling low-pass filter satisfy the perfect reconstruction filter bank condition within a predetermined error tolerance range.

Third Condition: the sum of the group delay of the first downsampling low-pass filter and the group delay of a normalized filter obtained by making the sum of all coefficients of the upsampling low-pass filter equal to 1 is substantially equal to an integer number at frequency ω=0 within a predetermined error tolerance range.

If the answer obtained in step 1710 is no, 2-to-1 downsampling is performed by use of coefficients ab(n)=at(N−n−1) (n=0, ..., N−1) that are obtained by switching the coefficients of the first downsampling low-pass filter between the higher-order side and the lower-order side. In step 1730, a 4:2:0 chroma image is output.

Tenth Embodiment

Figure 18:
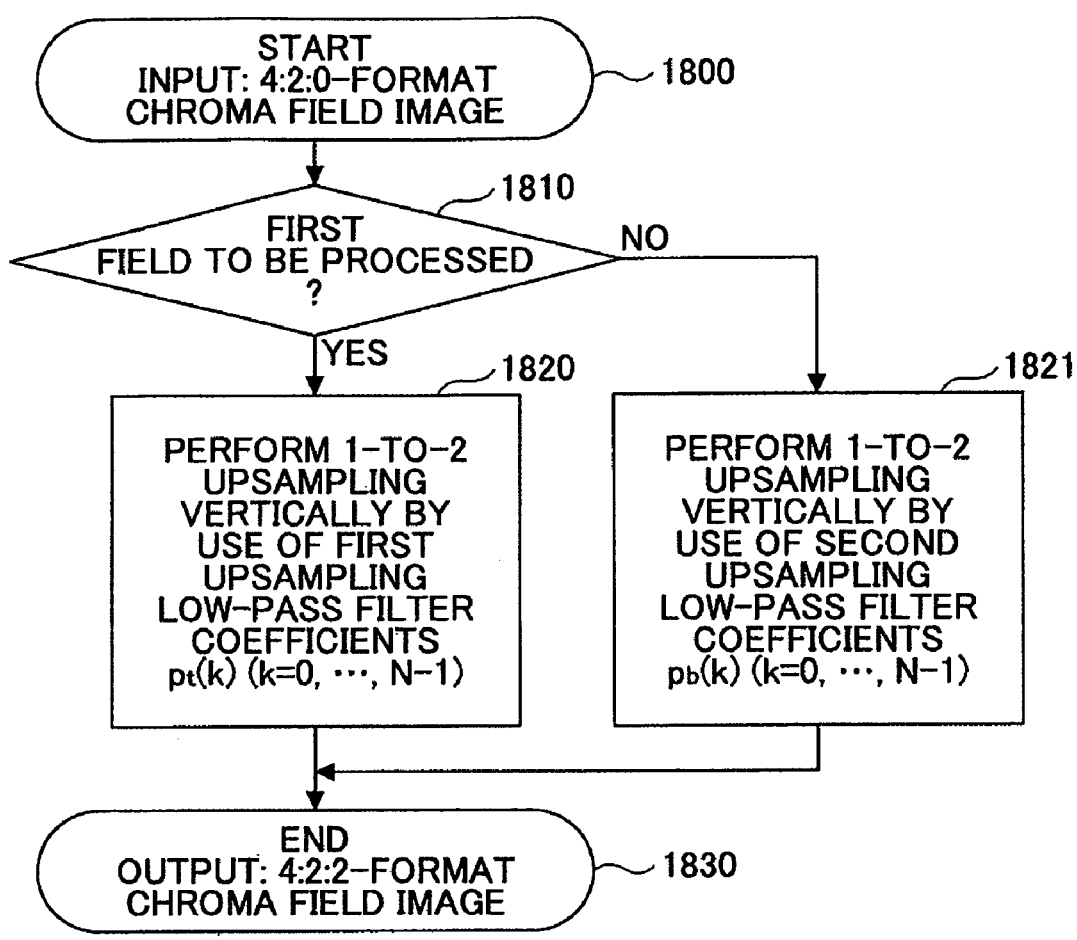
FIG. 18 is a drawing illustrating a 4:2:0-to-4:2:2 conversion method according to a tenth embodiment.

FIG. 18 is a drawing for explaining a tenth embodiment that is directed to a method for 4:2:0-to-4:2:2 conversion. In step 1800, a 4:2:0 chroma field image is input. In step 1810, a check is made as to whether the field of interest is a first field. If the answer is yes, 1-to-2 upsampling is performed in step 1820 by use of coefficients pt(n) (n=0, ..., N−1) satisfying the following conditions for use in a first upsampling low-pass filter.

First Condition: there is at least one downsampling low-pass filter, such that the filter having the above-noted coefficients and the downsampling low-pass filter satisfy the perfect reconstruction filter bank condition within a predetermined error tolerance range.

Second Condition: the downsampling low-pass filter has such a group delay that a modulo-1 remainder of the group delay at frequency ω=0 is substantially equal to 0.25.

Third Condition: the sum of the modulo-1 remainder of the group delay of the first downsampling low-pass filter and the modulo-1 remainder of the group delay of a filter obtained by multiplying the coefficients of the upsampling low-pass filter by a factor of 0.5 is substantially equal to 1 at frequency ω=0.

If the answer obtained in step 1810 is no, 1-to-2 upsampling is performed by use of coefficients pb(n)=pt(N−n−1) (n=0, ..., N−1) that are obtained by switching the coefficients of the first upsampling low-pass filter between the higher-order side and the lower-order side. In step 1830, a 4:2:2 chroma image is output. In the manner described above, the ninth and tenth embodiments satisfy filter conditions given as the first through third conditions, so that no pixel displacement occurs after 4:2:2-to-4:2:0 conversion and associated 4:2:0-to-4:2:2 conversion, and, also, chroma degradation does not worsen in cascade connections because of the attainment of the perfect reconstruction filter bank condition. Further, since the group delay of the 4:2:2-to-4:2:0 conversion is 0.25, compatibility with a conventional downsampling filter having preferable characteristics is attained in terms of phase characteristics. The filter coefficients used in the heretofore-described embodiments are only an example, and other filter coefficients may be used to simultaneously satisfy the first through third conditions or to simultaneously satisfy the first through fourth conditions. Further, the number of taps is not limited to eight. In apparatus implementation, limitations imposed by the required hardware size may require coefficients to be rounded to a proper number of digits at the expense of reconstruction error.

In the following, a description will be given of an example of top-field filter computation using rounded coefficients. Another example of filters A(z) and P(z) that simultaneously satisfy the first through fourth conditions is given in the following.

$at(0)=-0.008673583$ $at(1)=-0.026819158$ $at(2)=0.133775112$ $at(3)=0.549387953$ $at(4)=0.383323192$ $at(5)=-0.02266892$ $at(6)=-0.008424721$ $at(7)=0.000100124$ $pt(0)=0.045753444$ $pt(1)=-0.141471967$ $pt(2)=-0.062553387$ $pt(3)=0.90949634$ $pt(4)=1.119074193$ $pt(5)=0.233191111$ $pt(6)=-0.102274249$ $pt(7)=-0.001215483$

These coefficients may each be rounded to a number having 10 bits after the decimal points in binary representation as in the following.

$at(0)=-9/1024$ $at(1)=-27/1024$ $at(2)=137/1024$ $at(3)=563/1024$ $at(4)=393/1024$ $at(5)=-23/1024$ $at(6)=-9/1024$ $at(7)=0/1024$ $pt(0)=47/1024$ $pt(1)=-145/1024$ $pt(2)=-64/1024$ $pt(3)=931/1024$ $pt(4)=1146/1024$ $pt(5)=239/1024$ $pt(6)=-105/1024$ $pt(7)=-1/1024$

In a preferred method of computation, pixel values to be filtered are integer-multiplied by the integer part of the denominator of each filter coefficient as defined above for A(z) an P(z), and, then, the obtained products are added up, followed by adding 512 to the obtained sum for rounding purposes, and then discarding 10 bits (i.e., division by 1024). With this arrangement, proper filtering is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A signal processing apparatus for converting interlaced 4:2:2-format video signals including a luminance component and two chroma components into interlaced 4:2:0 format video signals, comprising:
   a first downsampling unit configured to apply vertical-direction filtering to pixels in a first chroma field of the interlaced 4:2:2-format video signals by use of a first downsampling low-pass filter and to downsample by a ratio of 2:1 to produce a first chroma field of the interlaced 4:2:0-format video signals; and
   a second downsampling unit configured to apply vertical-direction filtering to pixels in a second chroma field of the interlaced 4:2:2-format video signals by use of a second downsampling low-pass filter obtained by reversing an order of coefficients of the first downsampling low-pass filter and to downsample by a ratio of 2:1 to produce a second chroma field of the interlaced 4:2:0-format video signals,
   wherein the first downsampling low-pass filter has such a group delay that a modulo-1 remainder of the group delay at frequency ω=0 is substantially equal to 0.25,
   wherein the first downsampling low-pass filter is designed together with an associated upsampling low-pass filter such that the first downsampling low-pass filter and the upsampling low-pass filter satisfy perfect reconstruction filter bank condition within a predetermined error tolerance range, and such that a sum of the group delay of the first downsampling low-pass filter and a group delay of a normalized filter obtained by making a sum of all coefficients of the upsampling low-pass filter equal to 1 is substantially equal to an integer number at frequency ω=0 within a predetermined error tolerance range.

2. The signal processing apparatus as claimed in claim 1, wherein a first interpolation filter defined by comprising every other coefficient of the upsampling low-pass filter has a first group delay, and a second interpolation filter defined by comprising remaining coefficients of the upsampling low-pass filter that are not used by the first interpolation filter has a second group delay, and wherein one of a modulo-1 remainder of the first group delay at frequency ω=0 and a modulo-1 remainder of the second group delay at frequency ω=0 is substantially equal to 0.375, and another one of the modulo-1 remainder of the first group delay at frequency ω=0 and the modulo-1 remainder of the second group delay at frequency ω=0 is substantially equal to 0.875.

3. A signal processing apparatus for converting interlaced 4:2:0-format video signals including a luminance component and two chroma components into interlaced 4:2:2 format video signals, comprising:
   a first upsampling unit configured to apply vertical-direction filtering to pixels in a first chroma field of the interlaced 4:2:0-format video signals by use of a first upsampling low-pass filter and to upsample by a ratio of 1:2 to produce a first chroma field of the interlaced 4:2:2-format video signals; and
   a second upsampling unit configured to apply vertical-direction filtering to pixels in a second chroma field of the interlaced 4:2:0-format video signals by use of a second upsampling low-pass filter obtained by reversing an order of coefficients of the first upsampling low-pass filter and to upsample by a ratio of 1:2 to produce a second chroma field of the interlaced 4:2:2-format video signals,
   wherein the first upsampling low-pass filter is designed together with an associated downsampling low-pass filter such that the first upsampling low-pass filter and the downsampling low-pass filter satisfy perfect reconstruction filter bank condition within a predetermined error tolerance range, such that the downsampling low-pass filter has such a group delay that a modulo-1 remainder of the group delay at frequency ω=0 is substantially equal to 0.25, and such that a sum of the group delay of the downsampling low-pass filter and a group delay of a normalized filter obtained by making a sum of all coefficients of the first upsampling low-pass filter equal to 1 is substantially equal to an integer number at frequency ω=0 within a predetermined error tolerance range.

4. The signal processing apparatus as claimed in claim 3, wherein a first interpolation filter defined by comprising every other coefficient of the first upsampling low-pass filter has a first group delay, and a second interpolation filter defined by comprising remaining coefficients of the first upsampling low-pass filter that are not used by the first interpolation filter has a second group delay, and wherein one of a modulo-1 remainder of the first group delay at frequency ω=0 and a modulo-1 remainder of the second group delay at frequency ω=0 is substantially equal to 0.375, and another one of the modulo-1 remainder of the first group delay at frequency ω=0 and the modulo-1 remainder of the second group delay at frequency ω=0 is substantially equal to 0.875.

5. A signal processing apparatus for converting interlaced 4:2:2-format video signals including a luminance component and two chroma components into interlaced 4:2:0 format video signals, comprising:
   a filtering and downsampling unit; and
   a coefficient storage configured to store coefficients of a first downsampling low-pass filter,
   wherein the filtering and downsampling unit is configured to apply filtering to pixels in a first chroma field of the interlaced 4:2:2-format video signals by use of the coefficients of the first downsampling low-pass filter to produce a first chroma field of the interlaced 4:2:0-format video signals;
   wherein the filtering and downsampling unit is configured to apply filtering to pixels in a second chroma field of the interlaced 4:2:2-format video signals by use of second downsampling low-pass filter coefficients obtained by reversing an order of the coefficients of the first downsampling low-pass filter to produce a second chroma field of the interlaced 4:2:0-format video signals,
   wherein the first downsampling low-pass filter has such a group delay that a modulo-1 remainder of the group delay at frequency ω=0 is substantially equal to 0.25,
   wherein the first downsampling low-pass filter is designed together with an associated upsampling low-pass filter such that the first downsampling low-pass filter and the upsampling low-pass filter satisfy perfect reconstruction filter bank condition within a predetermined error tolerance range, and such that a sum of the group delay of the first downsampling low-pass filter and a group delay of a normalized filter obtained by making a sum of all coefficients of the upsampling low-pass filter equal to 1 is substantially equal to an integer number at frequency ω=0 within a predetermined error tolerance range.

6. The signal processing apparatus as claimed in claim 5, wherein a first interpolation filter defined by comprising every other coefficient of the upsampling low-pass filter has a first group delay, and a second interpolation filter defined by comprising remaining coefficients of the upsampling low-pass filter that are not used by the first interpolation filter has a second group delay, and wherein one of a modulo-1 remainder of the first group delay at frequency $\omega=0$ and a modulo-1 remainder of the second group delay at frequency $\omega=0$ is substantially equal to 0.375, and another one of the modulo-1 remainder of the first group delay at frequency $\omega=0$ and the modulo-1 remainder of the second group delay at frequency $\omega=0$ is substantially equal to 0.875.

7. A signal processing apparatus for converting interlaced 4:2:0-format video signals including a luminance component and two chroma components into interlaced 4:2:2 format video signals, comprising:
a filtering and upsampling unit; and
a coefficient storage configured to store coefficients of a first upsampling low-pass filter,
wherein the filtering and upsampling unit is configured to apply filtering to pixels in a first chroma field of the interlaced 4:2:0-format video signals by use of the coefficients of the first upsampling low-pass filter to produce a first chroma field of the interlaced 4:2:2-format video signals;
wherein the filtering and upsampling unit is configured to apply filtering to pixels in a second chroma field of the interlaced 4:2:0-format video signals by use of second upsampling low-pass filter coefficients obtained by reversing an order of the coefficients of the first upsampling low-pass filter to produce a second chroma field of the interlaced 4:2:2-format video signals,
wherein the first upsampling low-pass filter is designed together with an associated downsampling low-pass filter such that the first upsampling low-pass filter and the downsampling low-pass filter satisfy perfect reconstruction filter bank condition within a predetermined error tolerance range, such that the downsampling low-pass filter has such a group delay that a modulo-1 remainder of the group delay at frequency $\omega=0$ is substantially equal to 0.25, and such that a sum of the group delay of the downsampling low-pass filter and a group delay of a normalized filter obtained by making a sum of all coefficients of the first upsampling low-pass filter equal to 1 is substantially equal to an integer number at frequency $\omega=0$ within a predetermined error tolerance range.

8. The signal processing apparatus as claimed in claim 7, wherein a first interpolation filter defined by comprising every other coefficient of the first upsampling low-pass filter has a first group delay, and a second interpolation filter defined by comprising remaining coefficients of the first upsampling low-pass filter that are not used by the first interpolation filter has a second group delay, and wherein one of a modulo-1 remainder of the first group delay at frequency $\omega=0$ and a modulo-1 remainder of the second group delay at frequency $\omega=0$ is substantially equal to 0.375, and another one of the modulo-1 remainder of the first group delay at frequency $\omega=0$ and the modulo-1 remainder of the second group delay at frequency $\omega=0$ is substantially equal to 0.875.

9. A signal processing method of converting interlaced 4:2:2-format video signals including a luminance component and two chroma components into interlaced 4:2:0 format video signals, comprising:
applying vertical-direction filtering to pixels in a first chroma field of the interlaced 4:2:2-format video signals by use of a first downsampling low-pass filter to perform downsampling to produce a first chroma field of the interlaced 4:2:0-format video signals; and
applying vertical-direction filtering to pixels in a second chroma field of the interlaced 4:2:2-format video signals by use of a second downsampling low-pass filter obtained by reversing an order of coefficients of the first downsampling low-pass filter to perform downsampling to produce a second chroma field of the interlaced 4:2:0-format video signals,
wherein the first downsampling low-pass filter has such a group delay that a modulo-1 remainder of the group delay at frequency $\omega=0$ is substantially equal to 0.25,
wherein the first downsampling low-pass filter is designed together with an associated upsampling low-pass filter such that the first downsampling low-pass filter and the upsampling low-pass filter satisfy perfect reconstruction filter bank condition within a predetermined error tolerance range, and such that a sum of the group delay of the first downsampling low-pass filter and a group delay of a normalized filter obtained by making a sum of all coefficients of the upsampling low-pass filter equal to 1 is substantially equal to an integer number at frequency $\omega=0$ within a predetermined error tolerance range.

10. The signal processing method as claimed in claim 9, wherein a first interpolation filter defined by comprising every other coefficient of the upsampling low-pass filter has a first group delay, and a second interpolation filter defined by comprising remaining coefficients of the upsampling low-pass filter that are not used by the first interpolation filter has a second group delay, and wherein one of a modulo-1 remainder of the first group delay at frequency $\omega=0$ and a modulo-1 remainder of the second group delay at frequency $\omega=0$ is substantially equal to 0.375, and another one of the modulo-1 remainder of the first group delay at frequency $\omega=0$ and the modulo-1 remainder of the second group delay at frequency $\omega=0$ is substantially equal to 0.875.

11. A signal processing method of converting interlaced 4:2:0-format video signals including a luminance component and two chroma components into interlaced 4:2:2 format video signals, comprising:
applying vertical-direction filtering to pixels in a first chroma field of the interlaced 4:2:0-format video signals by use of a first upsampling low-pass filter to perform upsampling to produce a first chroma field of the interlaced 4:2:2-format video signals; and
applying vertical-direction filtering to pixels in a second chroma field of the interlaced 4:2:0-format video signals by use of a second upsampling low-pass filter obtained by reversing an order of coefficients of the first upsampling low-pass filter to perform upsampling to produce a second chroma field of the interlaced 4:2:2-format video signals,
wherein the first upsampling low-pass filter is designed together with an associated downsampling low-pass filter such that the first upsampling low-pass filter and the downsampling low-pass filter satisfy perfect reconstruction filter bank condition within a predetermined error tolerance range, such that the downsampling low-pass filter has such a group delay that a modulo-1 remainder of the group delay at frequency $\omega=0$ is substantially equal to 0.25, and such that a sum of the group delay of the downsampling low-pass filter and a group delay of a normalized filter obtained by making a sum of all coefficients of the first upsampling low-pass filter equal to 1 is substantially equal to an integer number at frequency $\omega=0$ within a predetermined error tolerance range.

12. The signal processing method as claimed in claim 11, wherein a first interpolation filter defined by comprising every other coefficient of the first upsampling low-pass filter has a first group delay, and a second interpolation filter defined by comprising remaining coefficients of the first upsampling low-pass filter that are not used by the first interpolation filter has a second group delay, and wherein one of a modulo-1 remainder of the first group delay at frequency $\omega=0$ and a modulo-1 remainder of the second group delay at frequency $\omega=0$ is substantially equal to 0.375, and another one of the modulo-1 remainder of the first group delay at frequency $\omega=0$ and the modulo-1 remainder of the second group delay at frequency $\omega=0$ is substantially equal to 0.875.

* * * * *